US006462844B1

(12) United States Patent
Kai et al.

(10) Patent No.: US 6,462,844 B1
(45) Date of Patent: Oct. 8, 2002

(54) WAVELENGTH-DIVISION MULTIPLEXING TRANSMISSION SYSTEM, A METHOD FOR DESIGNING A LOSS DIFFERENCE COMPENSATOR FOR OPTICAL DEVICES USED IN THE WAVELENGTH-DIVISION MULTIPLEXING TRANSMISSION SYSTEM, AND A METHOD FOR CONFIGURING THE WAVELENGTH-DIVISION MULTIPLEXING TRANSMISSION SYSTEM

(75) Inventors: Yutaka Kai; Hiroshi Onaka, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/236,326

(22) Filed: Jan. 25, 1999

(30) Foreign Application Priority Data

Mar. 19, 1998 (JP) .......................... 10-070819

(51) Int. Cl.[7] .............................. H04J 14/02
(52) U.S. Cl. ...................... 359/124; 359/161; 359/173
(58) Field of Search ................................ 359/161, 124, 359/130, 173

(56) References Cited

U.S. PATENT DOCUMENTS

| 5,305,134 | A | * | 4/1994 | Tsushima et al. ........... 359/124 |
| 5,706,125 | A | * | 1/1998 | Nakano ...................... 359/124 |
| 6,222,655 | B1 | * | 4/2001 | Terahara ..................... 359/124 |

FOREIGN PATENT DOCUMENTS

| JP | 55-25045 | 2/1980 |
| JP | 9-43647 | 2/1997 |
| JP | 9-189824 | 7/1997 |

OTHER PUBLICATIONS

A. Wada, et al., "Design of Narrow–Band Reflective Fiber Bragg Grating", *Technical Journal of Fujikara*, 93, pp. 6–12, (Oct. 1997).

T. Komukai, et al, "Recent Progress in Optical Fiber Bragg Gratings", *Technical Report of IEICE*, OPE95–114, pp. 19–24, (Dec. 1995).

* cited by examiner

*Primary Examiner*—Kinfe-Michael Negash
(74) *Attorney, Agent, or Firm*—Staas & Halsey LLP

(57) ABSTRACT

In a wavelength-division multiplexing transmission technique, a loss difference compensator for compensating a loss difference of an optical signal at each wavelength generated in a wavelength-division-multiplexed optical signal due to a wavelength-dependent transmission loss characteristic of an optical transmission line is disposed to the optical transmission line for transmitting the wavelength-division-multiplexed optical signal having a wide wavelength band in which optical signals at a plurality of wavelengths are wavelength-division-multiplexed to compensate the loss difference of the optical signal at each wavelength generated in the wavelength-division-multiplexed optical signal due to the wavelength-dependent transmission loss characteristic of the optical transmission line and a dispersion compensator, thereby transmitting the wavelength-division-multiplexed optical signal in a wide wavelength band for a long distance.

46 Claims, 24 Drawing Sheets

WAVELENGTH-DIVISION MULTIPLEXING TRANSMISSION SYSTEM, A METHOD FOR DESIGNING A LOSS DIFFERENCE COMPENSATOR FOR OPTICAL DEVICES USED IN THE WAVELENGTH-DIVISION MULTIPLEXING TRANSMISSION SYSTEM, AND A METHOD FOR CONFIGURING THE WAVELENGTH-DIVISION MULTIPLEXING TRANSMISSION SYSTEM

BACKGROUND OF THE INVENTION (1) Field of the Invention

The present invention relates to a wavelength-division multiplexing transmission system which wavelength-division-multiplexes optical signals. at a plurality of wavelengths and transmits the same, a method for designing a loss difference compensator for optical devices used in the wavelength-division multiplexing transmission system, and a method for configuring the wavelength-division multiplexing transmission system.

(2) Description of the Related Art

In order to realize a future multimedia network, there is, in these years, a demand for an optical communication system by which a larger capacity communication is feasible. A lot of researches have. been conducted on a time-division multiplexing (TDM) system, an optical time-division multiplexing (OTDM) system in the optical domain, a wavelength-division multiplexing (WDM) system and the like, as multiplexing (transmission) systems enabling very large capacity communications.

Among them, the WDM transmission system is expected as a means to realize a optical network which can flexibly multiplex different types of services by crossconnecting or branching and inserting at the optical level using a wide gain band of an erbium doped fiber amplifier (EDFA).

In the WDM transmission system (wavelength-division multiplexing transmission system), optical repeaters each having an optical amplifier such as an EDFA or the like are, in general, connected in plural stages according to a transmission power (a transmittable distance) of a used optical transmission line, whereby a long-distance transmission of a WDM signal is possible.

However, an optical amplifier such as an EDFA or the like has an amplification (gain) characteristic dependent on wavelength, as well known. For this reason, even if a WDM signal having a flat power at each wavelength is transmitted, there are generated differences in loss of power of the wavelengths (gain tilt) of the received WDM signal at a receiving end.

In a system using a single mode fiber (SMF) whose zero-dispersion characteristic is 1.3 $\mu$m (micrometer) in a transmission line to WDM-transmit a lightwave centered at a 1.55 $\mu$m band, for example, an optical signal at a shorter wavelength has a smaller power at the receiving end, since the optical amplifier has a characteristic that the longer the wavelength, the larger the gain in the used wavelength band is [for example, 1530 to 1570 nm (nanometer)] (tilt upward toward the right). In the worst case, it is impossible to receive the optical signal at a shorter wavelength.

For the purpose of equalizing (compensating) differences in loss of the wavelengths generated in the WDM signal due to the gain characteristic of the optical amplifier, there have been proposed various techniques.

A technique disclosed in Japanese Patent Laid-Open Publication No. 9-436-47, for example, flattens the gain characteristic of the optical amplifier (EDFA) using a bending loss caused by a bending of an optical fiber. Namely, taking advantage of a fact that when an optical fiber is bent, the longer the wavelength, the larger the bending loss is, an optical fiber having a transmission characteristic approximately reverse to the gain characteristic of the optical amplifier is added to flatten the gain characteristic of the optical amplifier.

However, this technique can yield only an optical filter having a linear transmission characteristic since the technique utilizes a bend of an optical fiber. The gain characteristic of an actual optical amplifier is not linear so that such an optical filter cannot effectively flatten the gain characteristic of the optical amplifier, of course.

There is also proposed a technique in which a Fabry-Perot etalon filter is used as an optical filter being able to accomplish a non-linear transmission characteristic to flatten the gain characteristic of the optical amplifier more effectively.

Meanwhile, an optical fiber (SMF) used in the present WDM transmission system has absorption losses inherent to silica glass that is a material of the optical fiber such as ultraviolet loss, infrared loss and the like, and scattering losses such as Rayleigh scattering and the like (refer to FIG. 26). A transmission loss characteristic 100 is generated dependent on, mainly, Rayleigh scattering and infrared absorption among these losses. FIG. 27 shows a 1.55 $\mu$m band shown in FIG. 26 when enlarged. As seen from FIG. 27, a loss difference (a tilt downward to the right) are generated in a used wavelength band 101.

For this, even if a WDM signal having a flat power at each wavelength is inputted to an optical fiber, a difference is generated in the receiving level of the channel (a wavelength) at a receiving end as shown in FIG. 28, for example, due to the wavelength-dependent transmission loss characteristic of the optical fiber, leading to a variation in the transmission characteristic (S/N ratio) of each channel.

The above phenomenon is not a serious issue in the case where a used wavelength band is narrow (a WDM signal at one to several wavelengths, for example) and a transmission distance is short [several tens km (kilometer), for example] since the phenomenon can be avoided by setting the used wavelength band 101 shown in FIG. 27 in a portion where the transmission loss characteristic 100 is almost flat. However, in the case where the used wavelength band 101 is wide, a tilt inevitably exists in the transmission loss characteristic 100 so that a difference in loss is generated according to a transmission distance, leading to a very serious issue.

Particularly, a recent demand is to transmit more wavelengths (16 wavelengths or more, for example) for a longer distance (several hundreds kilometers, for example). For this, a loss difference generated due to the transmission loss characteristic 100 of the optical fiber is not negligible.

In the case where an SMF is used to perform optical transmission (WDM transmission) with a lightwave in a 1.55 $\mu$m band, there is often used a technique in which a dispersion compensation fiber (DCF) is used to cancel dispersion generated in a WDM signal due to a dispersion characteristic of the SMF. However, since the DCF is an optical fiber whose basic material is silica glass similarly to the SMF, the DCF has a transmission loss characteristic similar to that of the SMF.

When the DCF is used, a wavelength-dependent loss difference similar to that of the SMF is generated in not only the SMF but also the DCF so that a larger difference is generated in S/N ratio of each channel, as compared with a case of only the SMF, due to the transmission loss characteristic of both of the SMF and the DCF.

In the case where a used wavelength band 101 for a WDM signal is 1530 to 1570 nm, for example, a tilt (a loss difference) of 0.4 dB is generated when the WDM signal is transmitted for 80 km if a loss difference in the used wavelength band of the SMF is 0.005 dB/km. Moreover, if the DCF is used to compensate dispersion degradation in the SMF, a DCF with −1000 to −1200 pb/nm is required for 80 km of the SMF. This corresponds to about 10 km of a fiber length, generating a loss:difference of about 1 dB.

When the SMF and DFC are connected in several stages (3 or 4 stages, for example) to linearly repeat, a loss difference of about 5 to 6 db in total is generated by the SMFs and the DCFs. As a result, an S/N ratio of each channel is largely degraded. In the worst case, it is impossible to receive a wavelength (a channel) on the shorter wavelength's side.

When the SMF or the DCF is used in a WDM transmission system, it is important to compensate the above loss difference, in consideration of a wavelength-dependent transmission loss characteristic of the SMF or the DCF itself. Particularly, when 16 or more lightwaves are wavelength-division-multiplexed and a WDM signal whose used wavelength band is 12 nm or more is transmitted, the above compensation is very important since a tilt in the transmission loss characteristic appears noticeable.

However, in the above-described WDM transmission system, the principal object is to flatten the gain characteristic of an optical amplifier on the assumption that a loss difference in a WDM signal at the receiving end is generated due to mainly the wavelength-dependent gain characteristic of the optical amplifier, there is thus no consideration on a transmission loss characteristic of the SMF or the DCF. Accordingly, even if an output power of the WDM signal can be flat at each wavelength in the optical amplifier, a variation is inevitably generated in the transmission characteristic (S/N ratio) of each channel depending on a transmission distance on the SMF or the DCF thereafter.

SUMMARY OF THE INVENTION

In the light of the above problems, an object of the present: invention is to provide a wavelength-division multiplexing transmission system which can compensate a loss difference of an optical signal at each wavelength generated in a wavelength-division-multiplexed optical signal due to a wavelength-dependent transmission loss characteristic of not only an optical amplifier but also an optical transmission line and a dispersion compenstor to transmit the wavelength-division-multiplexed optical signal in a wide wavelength band for a long distance.

Another object of the present invention is to provide a method for designing a loss difference compensator for an optical device used in the wavelength-division multiplexing transmission system, thereby readily designing a loss difference compensator which can compensate a loss difference generated due to a loss characteristic of the optical device used in the wavelength-division multiplexing transmission system. Still another object of the present invention is to provide a method for configuring a wavelength-division multiplexing transmission system, using the loss difference compensator designed in the above designing method.

The present invention therefore provides a wavelength-division multiplexing transmission system comprising an optical transmission line for transmitting a wavelength-division-multiplexed optical signal having a wide wavelength band in which optical signals at a plurality of wavelengths are wavelength-division-multiplexed, and a loss difference compensator disposed in the optical transmission line. to compensate a loss difference of an optical signal at each wavelength generated in the wavelength-division-multiplexed optical signal due to a wavelength-dependent transmission loss characteristic of the optical transmission line.

The wavelength-division multiplexing transmission system of this invention can thereby make the loss characteristic of the optical transmission line be independent of wavelength to always suppress a variation in receiving level at each wavelength to a minimum. It is therefore possible to readily realize a system which can transmit a wavelength-division-multiplexed optical signal in a wide wavelength band for a long distance, thus largely improving serviceability of various communications using the wavelength-division multiplexing transmission.

The above loss difference noticeably appears when the above wavelength-division-multiplexed optical signal has a wavelength band of not less than 12 nanometer centered at a 1.55 micrometer band as the above wide wavelength band, and cannot be ignored depending on a transmission distance of the wavelength-division-multiplexed optical signal. In such case, the loss difference compensation by the above loss difference compensator is very effective.

The above loss difference compensator may be configured with an optical filter having a loss difference compensation characteristic according to a transmission distance of the wavelength-division-multiplexed optical signal in order to compensate a loss. difference generated according to the transmission. distance. In which case, it is possible to compensate the above loss difference only by disposing the optical filter in the optical transmission line without any special control for compensating the above loss difference, leading to simplification of the system.

The present invention further provides a wavelength-division multiplexing transmission system comprising an optical transmission line for transmitting a wavelength-division-multiplexed optical signal in which optical signals at a plurality of wavelengths are wavelength-division-multiplexed, a dispersion compensator for compensating dispersion generated in the wavelength-division-multiplexed optical signal due to a dispersion characteristic of the optical transmission line, and a loss difference compensator disposed in the optical transmission line to compensate a loss difference of an optical signal at each wavelength generated in the wavelength-division-multiplexed optical signal due to a wavelength-dependent transmission loss characteristic of the optical transmission line and a wavelength-dependent transmission loss characteristic of the dispersion compensator.

The above wavelength-division multiplexing transmission system can make the loss characteristic of the whole system be wavelength-independent. Even in a system of a type compensating dispersion of an optical transmission line using a loss difference compensator, it is possible to always suppress a variation in receiving level at each wavelength to a minimum. Accordingly, a WDM signal can be transmitted for a long distance in a high signal quality, and serviceability of various communications using the wavelength-division multiplexing transmission can be largely improved.

The above loss difference noticeably appears when the above wavelength-division-multiplexed optical signal has a wide wavelength band wider than a predetermined wavelength band (12 nanometer centered at a 1.55 micrometer band, for example), and cannot be ignored depending on a transmission distance of the wavelength-division-multiplexed optical signal. In such case, loss difference compensation by the loss difference compensator is very effective.

Incidentally, if the above loss difference compensator is disposed in the pre-stage of the dispersion compensator, it is possible to suppress a level of the wavelength-division-multiplexed optical signal in the pre-stage of the dispersion compensator. In this case, a phenomenon that an adverse effect is exerted on the above dispersion compensation because of an excessively high input level of the wavelength-division-multiplexed optical signal to the dispersion compensator can be avoided. It is therefore possible to stably perform the dispersion compensation and the loss difference compensation on the wavelength-division-multiplexed optical signal, leading to a large improvement of reliability of the system.

The. above loss difference compensator may be configured with an optical filter having a loss difference characteristic according to a transmission distance of the above wavelength-division-multiplexed optical signal in order to compensate a loss difference generated according to the above transmission distance. In which case, it is possible to realize compensation of a loss difference generated by the above optical transmission line and the dispersion compensator only by providing the optical filter in the optical transmission line, which leads to simplification of the system.

The present invention still further provides a wavelength-division multiplexing transmission system comprising an optical transmission line for transmitting a wavelength-division-multiplexed optical signal in which optical signals at a plurality of wavelengths are wavelength-division-multiplexed, an optical amplifier for amplifying the wavelength-division-multiplexed optical signal, and a loss difference compensator disposed in the optical transmission line to compensate a loss difference of an optical signal at each wavelength generated in the wavelength-division-multiplexed optical signal due to a wavelength-dependent transmission loss characteristic of the optical transmission line and a wavelength-dependent amplification loss characteristic of the optical amplifier.

In this case, the loss characteristic of the whole system can be wavelength-independent. Even in a system transmitting a wavelength-division-multiplexed optical signal while appropriately amplifying the same, it is possible to always suppress a variation in receiving level at each wavelength to a minimum, which leads to a large improvement of serviceability of various communications using wavelength-division multiplexing transmission.

The above loss difference noticeably appears when the above wavelength-division-multiplexed optical signal has a wide wavelength band wider than a predetermined wavelength band (12 nanometer centered at a 1.55 micrometer band, for example), and cannot be ignored depending on a transmission distance of the wavelength-division-multiplexed optical signal. In such case, loss difference compensation by the above loss difference compensator is very effective.

The above. loss difference compensator may be configured with an optical filter having a loss difference compensation characteristic according to a transmission distance of the above wavelength-division-multiplexed optical signal in order to compensate the above loss difference generated according to the transmission distance. In which case, it is possible to readily realize compensation of a loss difference generated by the above optical transmission line and the optical amplifier only by disposing the optical filter in the optical transmission line without any special control for the above loss difference compensation.

The present invention still further provides a wavelength-division multiplexing transmission system comprising an optical transmission line for transmitting a wavelength-division-multiplexed optical signal in which optical signals at a plurality of wavelengths are wavelength-division-multiplexed, a dispersion compensator for compensating dispersion generated in the wavelength-division-multiplexed optical signal due to a dispersion characteristic of the optical transmission line, an optical amplifier for amplifying the wavelength-division-multiplexed optical signal, and a loss difference compensator disposed in the optical transmission line to compensate a loss difference of an optical signal at each wavelength generated in the wavelength-division-multiplexed optical signal due to a wavelength-dependent transmission loss characteristic of the optical transmission line, a wavelength-dependent transmission loss characteristic of the dispersion compensator and a wavelength-dependent amplification loss characteristic of the optical amplifier.

In this case, the loss characteristic of the whole system can be wavelength-independent. Even in a system transmitting a wavelength-division-multiplexed optical signal while appropriately amplifying the same, it is possible to always suppress a variation in receiving level at each wavelength to a minimum so that the wavelength-division-multiplexed optical signal can be transmitted for a longer distance in a higher signal quality, which leads to a large improvement of serviceability of various communications using wavelength-division multiplexing transmission.

The above loss difference noticeably appears when the above wavelength-division-multiplexed optical signal has a wide wavelength band wider than a predetermined wavelength band (particularly, 12 nanometer centered at a 1.55 micrometer band), and cannot be ignored depending on a transmission distance of the wavelength-division-multiplexed optical signal. In such case, loss difference compensation by the above loss difference compensator is very effective.

In this case, if the above loss difference copensator is disposed in the pre-stage of the dispersion compensator, it is possible to suppress a level of the wavelength-division-multiplexed optical signal in the pre-stage (loss difference compensator) of the dispersion compensator. It is therefore possible to avoid an adverse effect on the above dispersion compensation because of an excessively high input level of the wavelength-division-multiplexed optical signal to the dispersion compensator without an exclusive circuit for suppressing a level of the wavelength-division-multiplexed optical signal.

The above loss difference compensator may be configured with an optical filter having a loss difference compensation characteristic according to a transmission distance of the above wavelength-division-multiplexed optical signal in order to compensate a loss difference generated according to the transmission distance. In which case, it is possible to very easily accomplish compensation of a loss difference caused by the optical transmission line, the dispersion compensator and the optical amplifier only by disposing the optical filter in the optical transmission line without any special control for compensating the above loss difference.

The present invention also provides a method for designing a loss difference compensator for an optical device used in a wavelength-division multiplexing transmission system comprising the steps of preparing a menu table in which, correspondingly to information on the optical device used in the wavelength-division multiplexing transmission system for transmitting a wavelength-division-multiplexed optical signal in which optical signals at a plurality of wavelengths are wavelength-division-multiplexed, information on a loss difference compensation characteristic of a loss difference compensator for compensating a loss difference of an optical signal at each wavelength generated in the wavelength-division-multiplexed optical signal due to a wavelength-dependent loss characteristic of the optical device is classified, and selecting a loss difference compensation characteristic corresponding to the optical device used in the wavelength-division multiplexing transmission system on the basis of the menu table to design a loss difference compensator having the loss difference compensation characteristic.

According to the above designing method, it is possible to suppress the number of types of the loss difference compensator having the most suitable loss difference compensation characteristic according to a used optical device. Therefore, a loss difference compensator according to a used optical device may be fabricated in large volumes, and thus a manufacturing cost of the loss difference compensator may be reduced, which leads to a decrease of a cost of the wavelength-division multiplexing transmission system to be configured.

If the above optical device is an optical transmission line, information on the loss difference compensation characteristic compensating a loss difference generated due to a wavelength-dependent transmission loss characteristic of the optical transmission line is classified correspondingly to information on the optical transmission line, thereby readily design a loss difference compensator having the most suitable loss difference compensation characteristic according to a used optical transmission line.

If the above optical device is an optical transmission line and a dispersion compensator disposed in the optical transmission line to compensate dispersion generated in the wavelength-division-multiplexed optical signal due to a dispersion characteristic of the optical transmission line, information on a loss difference compensation characteristic compensating the loss difference generated due to a wavelength-dependent transmission loss characteristic of the optical transmission line and a wavelength-dependent transmission loss characteristic of the dispersion compensator is classified correspondingly to a combination of information on the optical transmission line and information on the dispersion compensator, thereby readily designing a loss difference compensator having the most suitable loss difference compensation characteristic according to a used optical transmission line and dispersion compensator.

If the above optical device is an optical transmission line, and an optical amplifier disposed in the optical transmission line to amplify the wavelength-division-multiplexed optical signal, information on a loss difference compensation characteristic compensating a loss difference generated due to a wavelength-dependent transmission loss characteristic of the optical transmission line and a wavelength-dependent amplification loss characteristic of the optical amplifier is classified, correspondingly to a combination of information on the optical transmission line and information on the optical amplifier, thereby readily designing a loss difference compensator having the most suitable loss difference compensation characteristic according to a used optical transmission line and optical amplifier.

If the above optical device is an optical transmission line, a dispersion compensator disposed in the optical transmission line to compensate dispersion generated in the wavelength-division-multiplexed optical signal due to a dispersion characteristic of the optical transmission line, and an optical amplifier disposed in the optical transmission line to amplify the wavelength-division-multiplexed optical signal, information on a loss difference compensation characteristic compensating a loss difference generated due to a wavelength-dependent loss characteristic of each of the optical transmission line, the dispersion compensator and the optical amplifier is classified, correspondingly to a combination of information on the optical transmission line, information on the dispersion compensator and information on the optical amplifier, thereby readily designing a loss difference compensator having the most suitable loss difference compensation characteristic according to used optical transmission line, dispersion compensator and optical amplifier.

The above loss difference noticeably appears when the above wavelength-division-multiplexed optical signal has a wide wavelength band wider than a predetermined wavelength band (particularly, 12 nanometer centered at a 1.55 micrometer band), and cannot be ignored depending on a transmission distance of the wavelength-division-multiplexed optical signal. In such case, the loss difference compensator designed as above is very effective.

In the above menu table, the information on the above optical device and the loss difference compensation characteristic may be classified according to a transmission distance of the above wavelength-division-multiplexed optical signal. In which case, a loss difference compensation characteristic corresponding to the optical devices according to a transmission distance of the wavelength-division-multiplexed optical signal is selected on the basis of the menu table.

It is thereby possible to suppress the number of types of the loss difference compensation characteristic to a minimum according to a necessary transmission distance, leading to a decrease of the number of types of the loss difference compensator to be designed, and mass production of the loss difference compensator in larger volumes.

The present invention still further provides a method for configuring a wavelength-division-multiplexing transmission system comprising the steps of preparing a menu table in which information on a loss difference compensation characteristic of a loss difference compensator for compensating a loss difference of an optical signal at each wavelength generated in a wavelength-division-multiplexed optical signal in which- optical signals at a plurality of wavelengths are wavelength-division multiplexed due to a wavelength-dependent loss characteristic of an optical device used in the wavelength-division-multiplexing transmission system for transmitting the wavelength-division multiplexed optical signal is classified correspondingly to information on the optical device, selecting a loss difference compensation characteristic corresponding to the optical device used in the wavelength-division multiplexing transmission system on the basis of the menu table to design a loss difference compensator having the loss difference compensation characteristic, and configuring the wavelength-division multiplexing transmission system using the optical device and the designed loss difference compensator.

According. to the method for configuring a wavelength-division multiplexing transmission system of the present invention, it is possible to configure a wavelength-division multiplexing transmission system which can compensate a loss difference of an optical signal at each wavelength generated by the used optical divice, very readily and at a low cost.

DESCRIPTION OF THE PREFERRED EMBODIMENT

Figure 1:
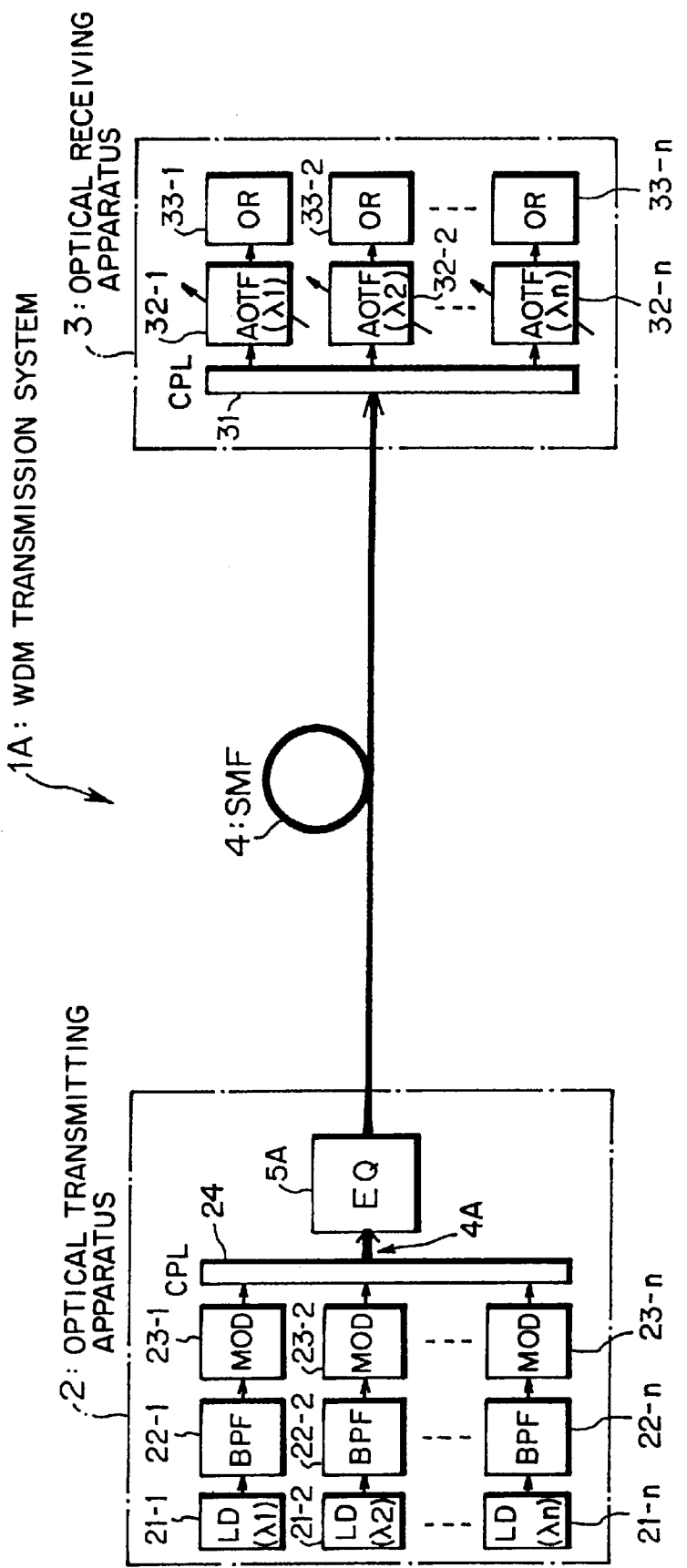
FIG. 1 is a block diagram showing a structure of a wavelength-division multiplexing (WDM) transmission system according to a first embodiment of this invention.

Hereinafter, description will be made of embodiments of this invention referring to the drawings.

(A) Description of a First Embodiment

FIG. 1 is a block diagram showing a structure of a wavelength-division multiplexing (WDM) transmission system according to a first embodiment of this invention. As shown in FIG. 1, a WDM transmission system 1A (hereinafter, simply referred to as "system 1A" occasionally) has an optical transmitting apparatus 2, an optical receiving apparatus 3, and an optical fiber (sigle mode fiber; SMF) 4 as an optical transmission line for connecting the optical transmitting apparatus 2 to the optical receiving apparatus 3.

The optical transmitting apparatus 2 transmits a wavelength-division-multiplexed optical signal (hereinafter, referred to as a WDM signal)in which optical signals at n (n is a natural number not less than two) wavelengths $\lambda 1$, $\lambda 2$, ... $\lambda$ n (corresponding to channels 1, 2, ... n) are wavelength-division-multiplexed. According to this embodiment, the WDM signal is such generated and transmitted that a transmitting power of an optical signal (hereinafter, mentioned as "an optical signal $\lambda i$, occasionally) at each wavelength $\lambda i$ (i=1 through n) has a flat characteristic.

For this reason, the optical transmitting apparatus 2 of this embodiment has, basically, light sources (laser diodes: LDs) 21-1 through 21-n, band-pass filters (BPFS) 22-1 through 22-n, modulators (MODs) 23-1 through 23-n and an optical coupler 24 with a ratio of n:1. A reference numeral 5A denotes an optical equalizing filter (loss difference compensator) whose functions will be described later.

Each of the LDs 21-i generates an optical signal at each wavelength $\lambda i$. Each of the BPFs 22-i transmits only a signal at a wavelength $\lambda i$ generated by a corresponding LD 21-i. Each of the modulators 23-i performs a desired modulating process on an optical signal $\lambda i$ transmitted through a corresponding BPF 22-i. The optical coupler 24 couples (wavelength-division-multiplexes) the optical signals $\lambda i$ modulated by the respective modulators 23-i, and outputs the optical signals as a WDM signal to the SMF 4. The above BPFs 22-i are unnecessary when the optical signals generated by the LDs 21-i are sufficiently stable, or a performance of the optical coupler 24 is fine.

The optical receiving apparatus 3 wavelength-division-demultiplexes the WDM signal transmitted over the SMF 4 into optical signals at wavelengths λi to receive the optical signals. For this purpose, the optical receiving apparatus 3 has an optical coupler 31 for wavelength-division-demultiplexing the received WDM signal into n optical signals at wavelengths λi, optical filters 32-i each for selecting (transmitting) only an optical signal λi to be received of the WDM signal splitted by the optical coupler 31, and optical receivers (ORs) 33-i each for receiving an optical signal λi transmitted through a corresponding optical filter 32-i.

As the above optical filter 32-i, here is employed an acousto-optic tunable filter (AOTF) which can change a wavelength to be selected according to a frequency of a supplied RF (Radio Frequency) signal. WDM transmission using only the SMF 4 without a dispersion compensation fiber (DCF) is adapted to a case of a short transmission distance, or a case of a low-speed transmission at not larger than 2.5 Gb/s (when an effect of dispersion degradation is small).

With the above structure, the WDM system 1A of this embodiment can transmit a WDM signal in which optical signals at n wavelengths λ1 through λn are wavelength-division-multiplexed from the optical transmitting apparatus 2 over the SMF 4, and wavelength-division-demultiplex the WDM signal into optical signals at wavelengths λi to receive the optical signals by the optical receiving apparatus 3, basically, similarly to the existing WDM system.

Figure 26:
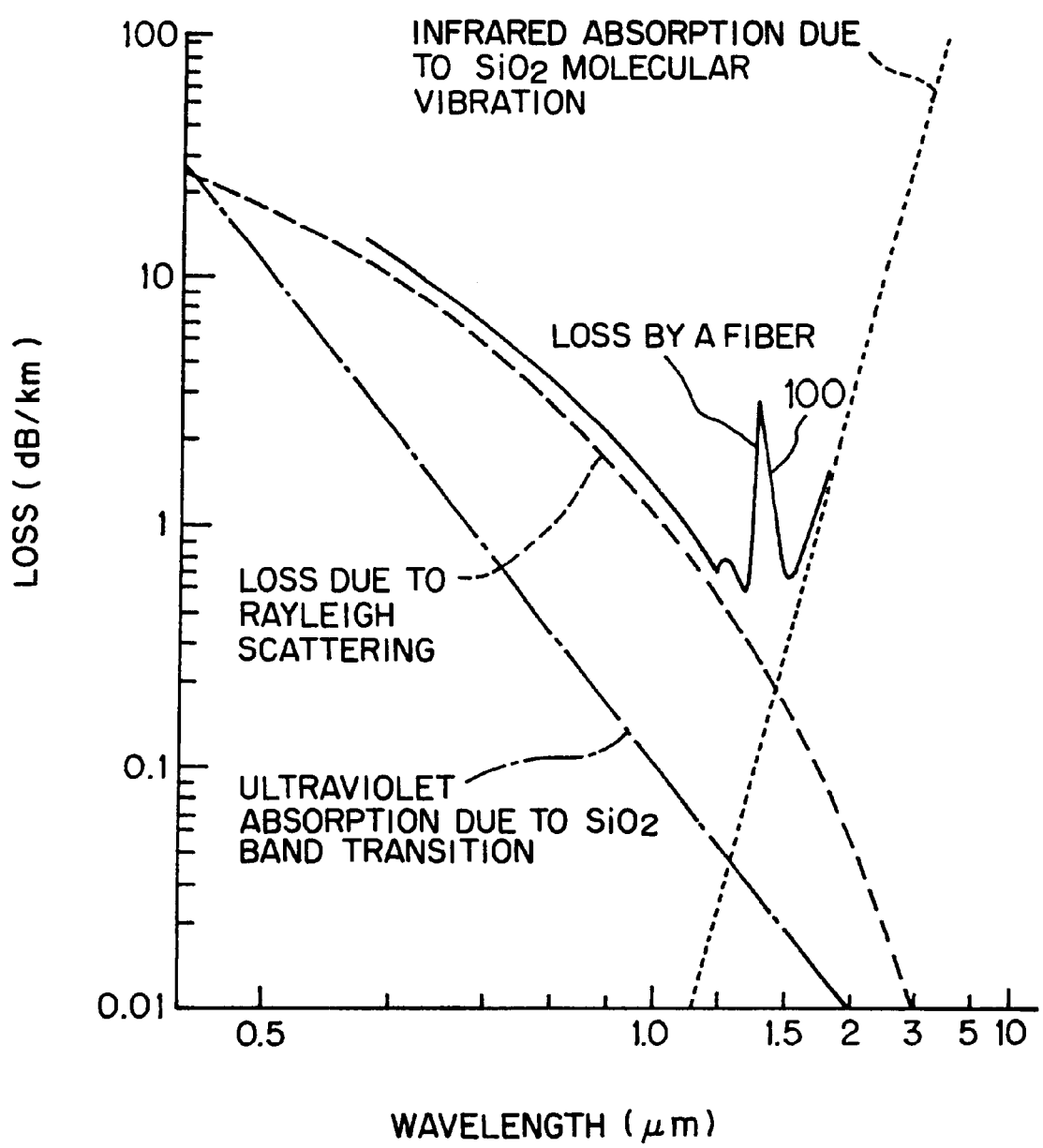
FIGS. 26 and 27 are diagrams for illustrating a wavelength-dependent transmission loss characteristic of a single mode fiber (SMF)
Figure 27:
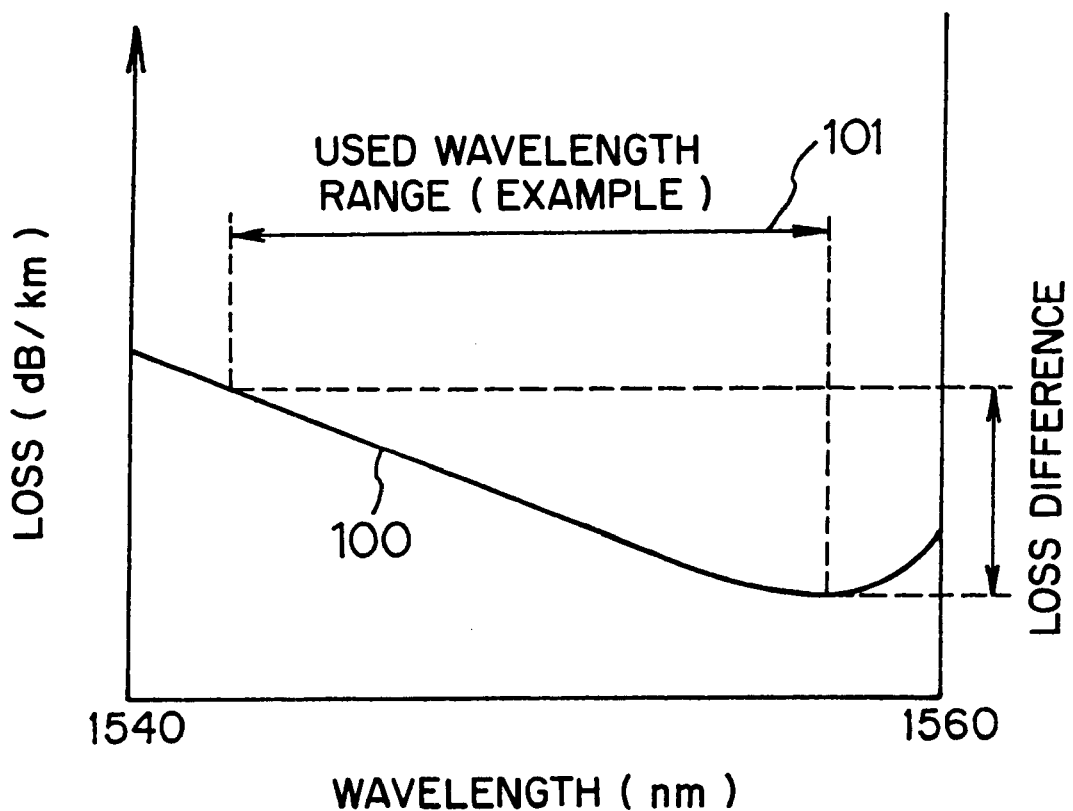
Figure 28:
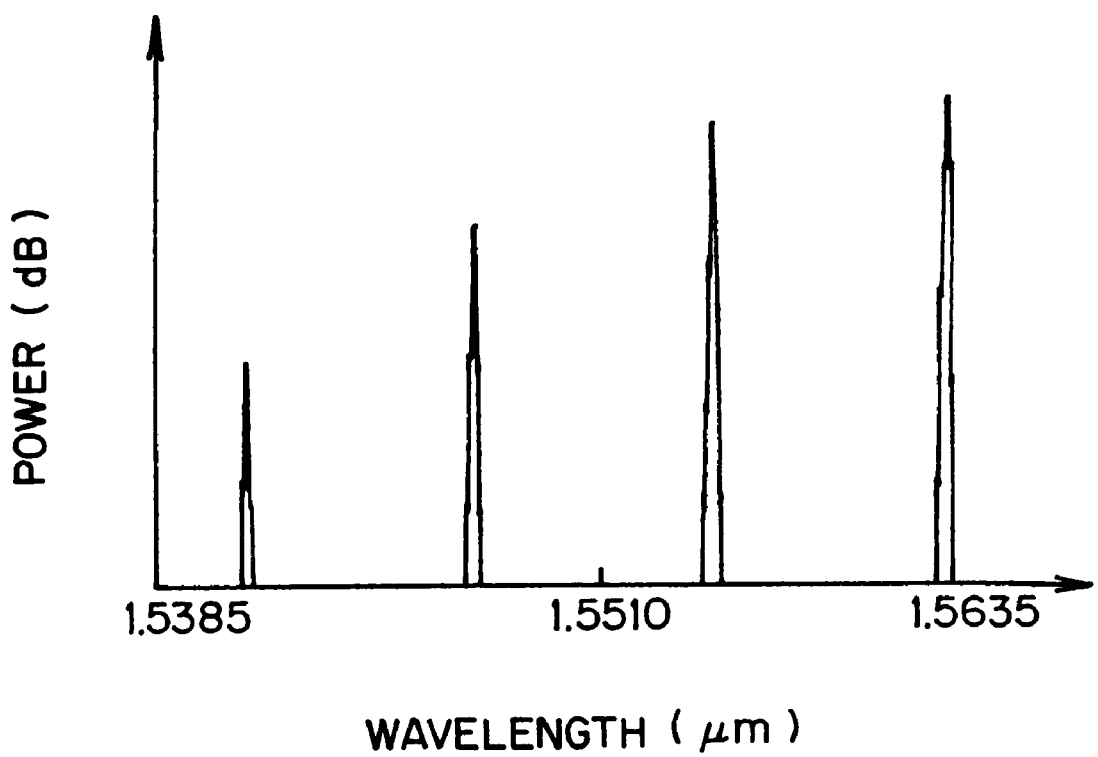
FIG. 28 is a diagram for illustrating a loss difference at each wavelength generated in a WDM signal due to the wavelength-dependent transmission loss characteristic of the single mode fiber (SMF).

However, the SMF 4 has the wavelength-dependent transmission loss characteristic (a tilt of the transmission loss; refer to FIGS. 26 and 27), as described before. Even if the optical transmitting apparatus 2 transmits a WDM signal whose transmission power at each wavelength λi is flat, a difference (a loss difference) in received power of an optical signal at each wavelength λi wavelength-division-demultiplexed by the optical couplers 31 and AOTFs 32-i is generated in the optical receiving apparatus 3, leading to a variation in S/N ratio at each wavelength (a channels i) λi.

The larger the times of multiplexing wavelengths n (namely, the wider a used wavelength band of the WDM signal), or the longer a transmission distance of the WDM signal (a length of the SMF, in this case) L, the more the variation in S/N ratio appears noticeably. For this, there is a case where a signal quantity (S/N ratio) of a part (shorter wavelengths, in general) of the channels is largely degraded to even below a receiving sensitivity of the optical receiving apparatus 33-i, depending on the times of multiplexing the wavelengths n or a transmission distance L so that the optical receiving apparatus 33-i cannot receive normally.

In concrete, it is known that the above phenomenon occurs due to the above transmission loss characteristic of the SMF 4 when the WDM signal is transmitted for about 3600/M (km) or more if a used wavelength band for the WDM signal is M (nm: nanometer) centered at a 1.55 μm band. In the case where 16 wavelengths (16 optical signals) are wavelength-division-multiplexed with a used wavelength band per one wavelength being 0.8 nm, for example, a used wavelength band M for the WDM signal is about 12 nm. When the WDM signal is transmitted for 3600/12=300 km or more, a part of the channels cannot be received. When 32 wavelengths are wavelength-division-multiplexed, a used wavelength band M for the WDM signal is about 25 nm so that a part of the channels cannot be received when the WDM signal is transmitted for 3600/25 144 km or more.

According to this embodiment, in order to suppress the variation in S/N ratio, the optical transmitting apparatus 2 is provided with the loss difference compensator [optical equalizing filter (passive element): EQ] 5A for compensating (flattening) a loss difference of an optical signal at each wavelength λi generated due to the wavelength-dependent transmission loss characteristic of the SMF 4 according to a length (transmission distance of the WDM signal) L of the SMF 4.

As the loss difference compensator 5A (hereinafter, referred to as a loss difference compensating device 5A or an optical equalizing filter 5A according to circumstances), here is used one having a loss difference compensation characteristic according to the above transmission distance L. In concrete, here is used one so designed as to have a wavelength transmission characteristic (hereinafter, referred simply as a transmission characteristic) reverse to a tilt characteristic of a received power in order to flatten the variation (tilt characteristic) of the received powers of the optical signal at each wavelength λi of the WDM signal received by the optical receiving apparatus 3, in this embodiment.

For instance, when a tilt upward to the right (namely, a shorter wavelength has a smaller power) is generated in the :received power of the WDM signal in the optical receiving apparatus 3 due to the above transmission loss characteristic of the SMF 4, one so designed as to have the transmission characteristic that a shorter wavelength has a larger quantity of the transmission of the WDM signal (a tilt downward to the right) is used. An optical power at each wavelength λi having passed through the optical equalizing filter 5A comes to thus have a tilt downward to the right. However, the SMF 4 has the transmission loss characteristic tilting upward toward the right so that the above tilt is cancelled and the received power of the WDM signal is thus of a flat characteristic at each wavelength λi, as a result.

Figure 2:
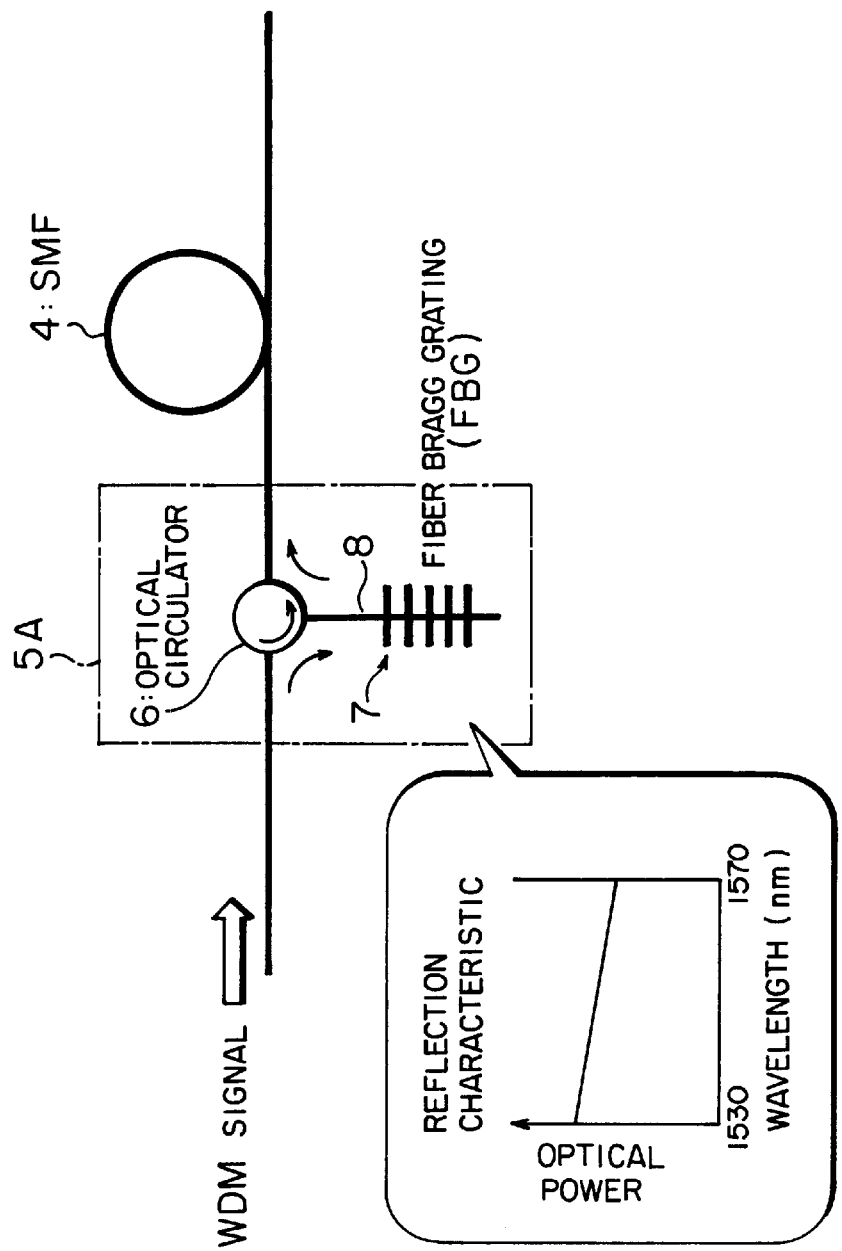
FIG. 2 is a block diagram showing a structure of a loss difference compensating device using of a fiber Bragg grating (FBG) of a light reflection type according to the first embodiment.

In concrete, the optical equalizing filter 5A according to this. embodiment has, as shown in FIG. 2, for example, an optical circulator (optical directional coupler) 6 and an optical fiber 8 in which a fiber Bragg grating (FBG) 7 of a light reflection type in which a quantity of reflection of an optical signal at each wavelength λi has a tilt characteristic upward to the right (namely, a reflection characteristic that the shorter a wavelength, a larger a quantity of reflected light is), thereby realizing the above transmission characteristic.

Namely, the WDM signal transmitted over the SMF 4 is branched by the optical circulator 6 to the side of the optical fiber 8, and a different quantity at each wavelength λi (here, a shorter wavelength has a larger quantity of reflected light) thereof is reflected by the FBG 7 according to the above reflection characteristic, after that, the WDM signal is again inputted to the SMF 4 through the optical circulator 6. Therefore, the optical equalizing filter 5A has the transmission characteristic tilting upward to the right.

Figure 3:
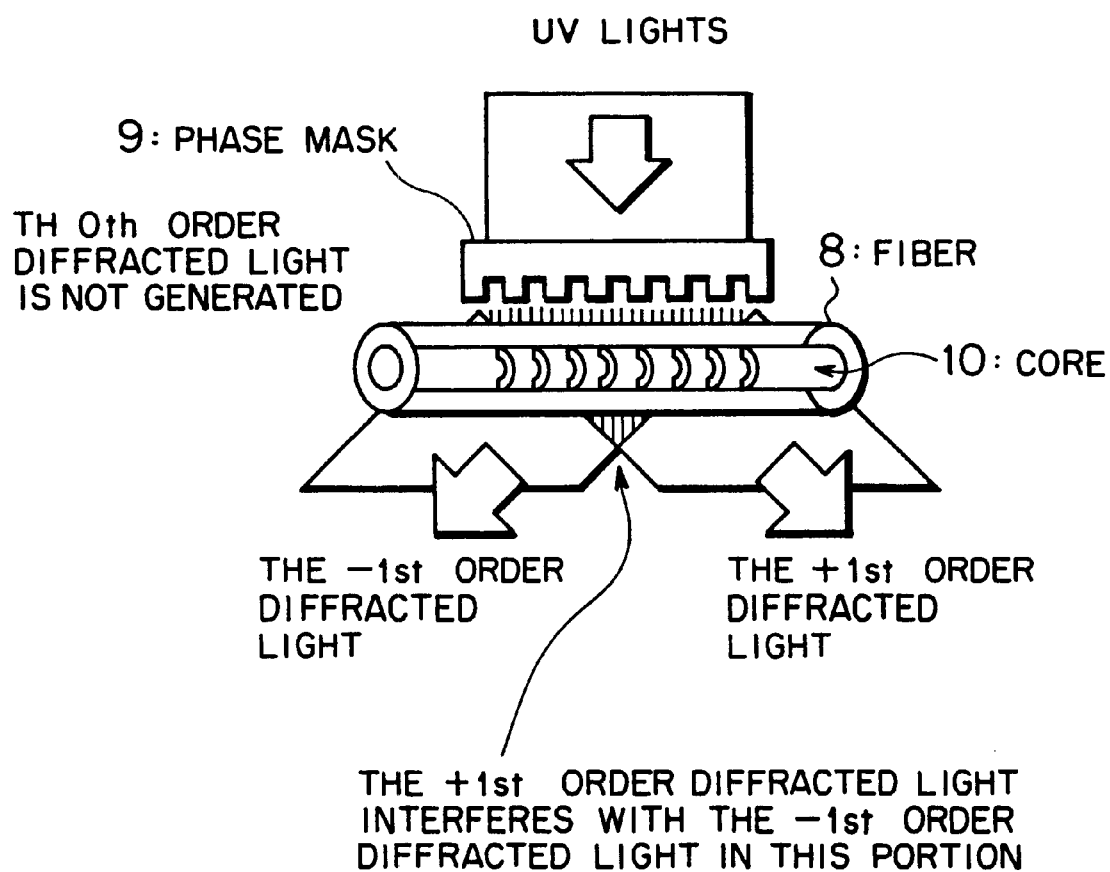
FIG. 3 is a diagram for illustrating a method for forming the FBG of a light reflection type.
Figure 4:
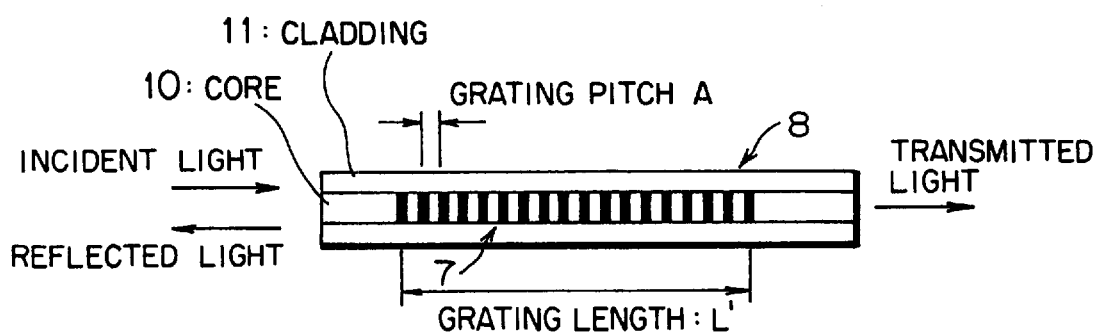
FIG. 4 is a schematic sectional view of the FBG of a light reflection type.

The above FBG 7 (referred to as a grating 7, occasionally) is formed, as shown in FIG. 3, by radiating an interference pattern generated when ultraviolet rays (UV lights) are interfered using a diffraction grating (phase mask) 9 (interference of the ±1 order of diffracted lights) on the optical fiber 8 to generate a change in the refractive index according to the above interference pattern of the UV lights in a core 10 of the optical fiber 8, as shown in FIG. 3, for example. Incidentally, a pitch A (refer to FIG. 4) of the formed grating 7 is changed by changing a pitch of the used diffraction grating 9.

Figure 6:
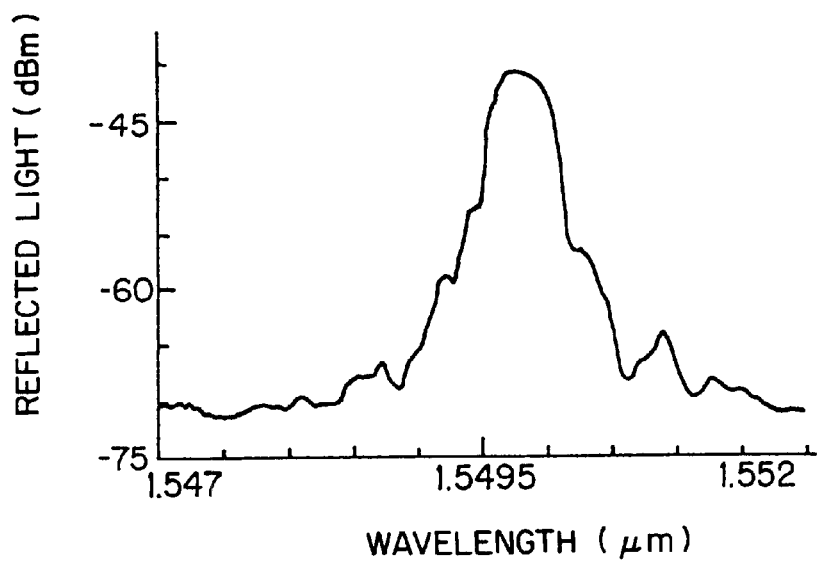
FIG. 6 is a diagram showing an example of a reflection characteristic of the FBG of a light reflection type.

The optical fiber 8 in which the grating 7 is formed has the reflection characteristic reflecting optical signals at a part of the wavelengths, as shown in FIG. 6, for example.

Generally, the smaller a pitch A of the grating 7 (the larger a change in the refractive index), the larger the reflactance is, and the larger a length L' of the grating 7 (refer to FIG. 4), the narrower a band of reflected wavelength is.

Figure 5:
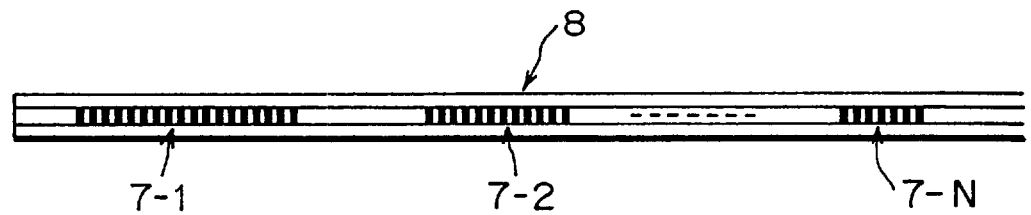
FIG. 5 is a schematic sectional view of the FBG of a light reflection type used in the loss difference compensating device according to the first embodiment.

If a plurality of gratings 7 having different pitches A or lengths L' are formed in the optical fiber 8, it is possible to fabricate an optical fiber 8 having a desired reflection characteristic (not only linear but also curved). According to this embodiment, as shown in FIG. 5, for example, an optical fiber 8 in which a plurality of gratings 7-1 through 7-N (N is a natural number) having different lengths L' are suitably combined is used to realize an optical equalizing filter 5A having the above transmission characteristic.

Figure 7:
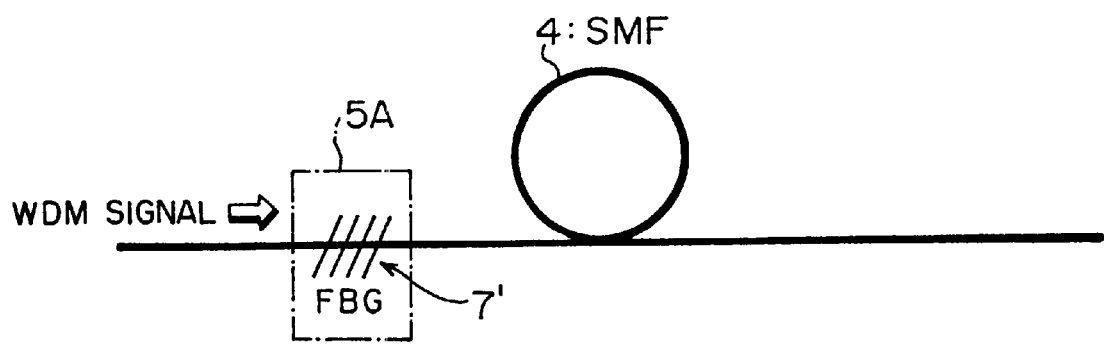
FIG. 7 is a block diagram showing a structure of the loss difference compensating device using a FBG of a light transmission type according to the first embodiment.
Figure 8:
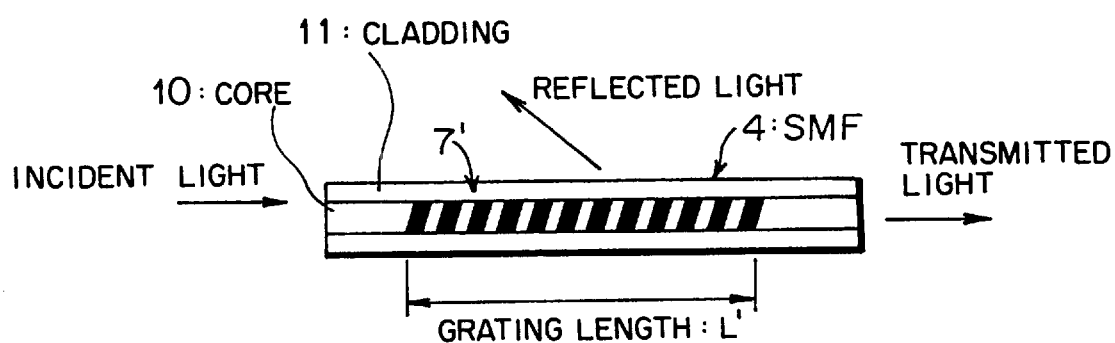
FIG. 8 is a schematic sectional view of the FBG of a light transmission type.
Figure 9:
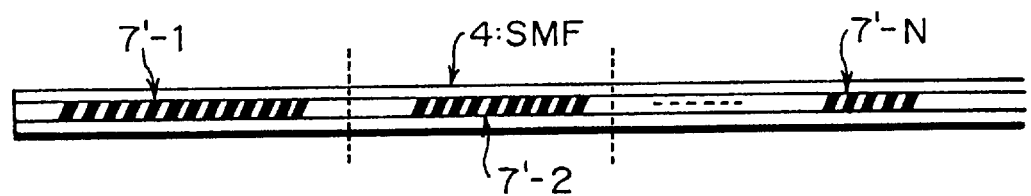
FIG. 9 is a schematic sectional view of the FBG of a light transmission type used in the loss difference compensating device according to the first embodiment.

Alternatively, the optical equalizing filter 5A having the above transmission characteristic can be realized as an FBG 7' of a light transmission type by directly forming a suitable combination of a plurality of gratings 7'-1 through 7'-N having different grating lengths L7 on the SMF 4, as shown in FIGS. 7 and 9, for example. In this case, in order to avoid an effect on the WDM signal transmitted over the SMF 4 by reflected lights from the FBG 7', the gratings 7'-1 through 7'-N are obliquely formed, as shown in FIGS. 8 and 9. Whereby, the reflected lights do not return but are emitted from a cladding 11 and scattered toward the outside so as not to interfere with the WDM signal. Accordingly, it is possible to decrease a return loss.

Unlike the case where a grating fiber in which the FBG 7' is formed on another optical fiber is fused to the SMF 4 to be interposed, directly forming the FBG 7' on the SMF 4 does not cause generation of a fused portion (splice), so as to decrease a loss of the optical power.

Figure 10:
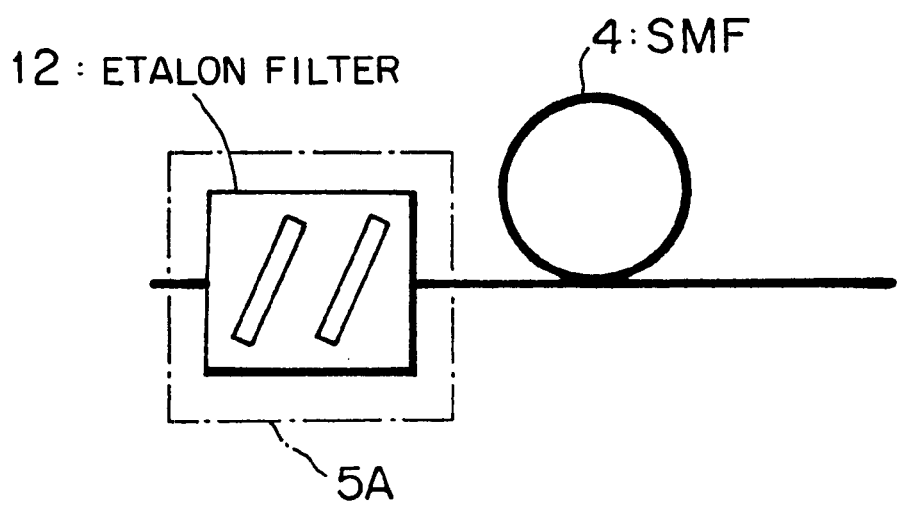
FIG. 10 is a block diagram showing a structure of the loss difference compensating device using a Fabry-Perot etalon filter according to the first embodiment.
Figure 11:
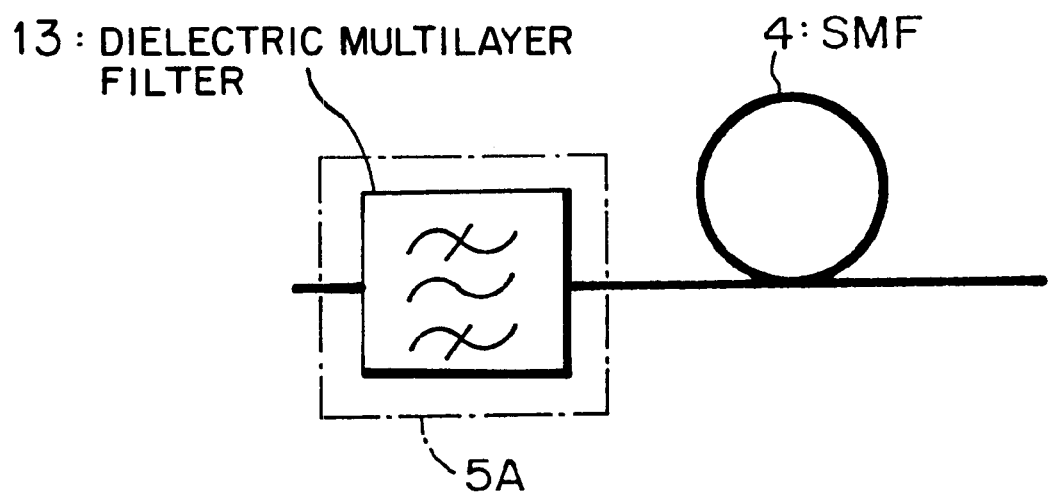
FIG. 11 is a block diagram showing a structure of the loss difference compensating device using a dielectric multilayer filter according to the first embodiment.
Figure 12:
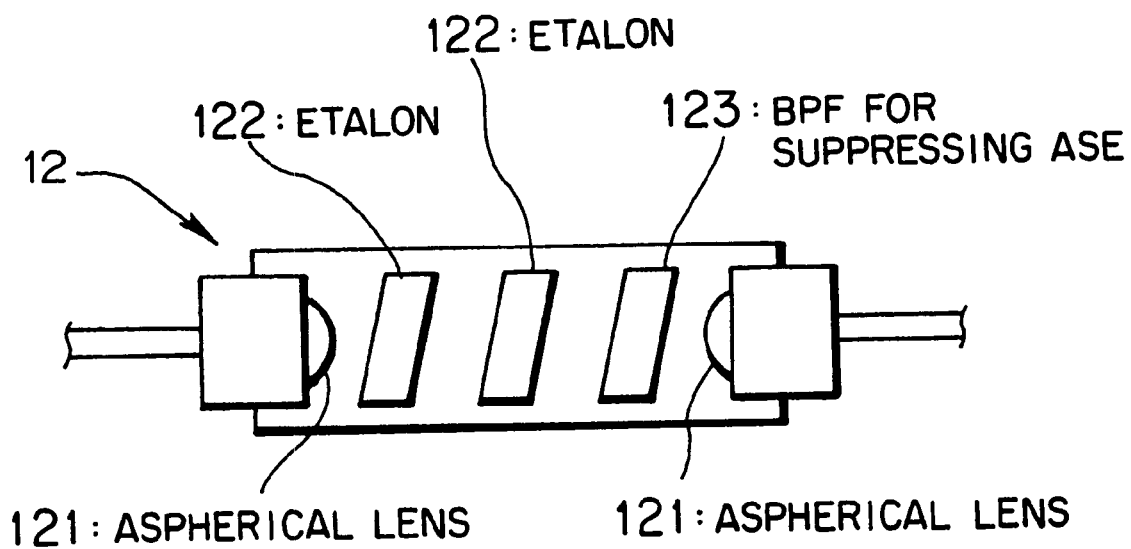
FIG. 12 is a block diagram showing an example of a structure of the Fabry-Perot etalon filter according to the first embodiment.

Still alternatively, the above optical equalizing filter 5A can be realized by using a Fabry-Perot etalon filter 12 as shown in FIGS. 10 and 12, for example, or by using a dielectric multilayer filter 13 as shown in FIG. 11, for example.

Namely, the Fabry-Perot etalon filter 12 has a characteristic that a quantity of transmitted lights between aspherical lens 121 is changed for each wavelength λi by changing an applied number of a plurality of etalons having different reflative indexes or changing an angle at which the etalons are mounted, as shown in FIG. 12. If using the above characteristic of the Fabry-Perot etalon filter 12 to adjust the transmission characteristic of the etalon filter 12, it is possible to realize an optical equalizing filter 5A having the above transmission characteristic (loss difference compensation characteristic). In FIG. 12, reference numeral 123 denotes a band-pass filter (BPF) for suppressing spontaneous emission lights (ASE).

On the other hand, the dielectric multilayer filter 13 has a characteristic that a quantity of transmitted lights is changed for each wavelength λi according to a used number of a plurality of film-like dielectrics having different reflative indexes. If adjusting the transmission characteristic of the dielectric multilayer filer 13 using the above characteristic, it is possible to realize an optical equalizing filter 5A having the above transmission characteristic (loss difference compensation characteristic), as well.

Figure 13:
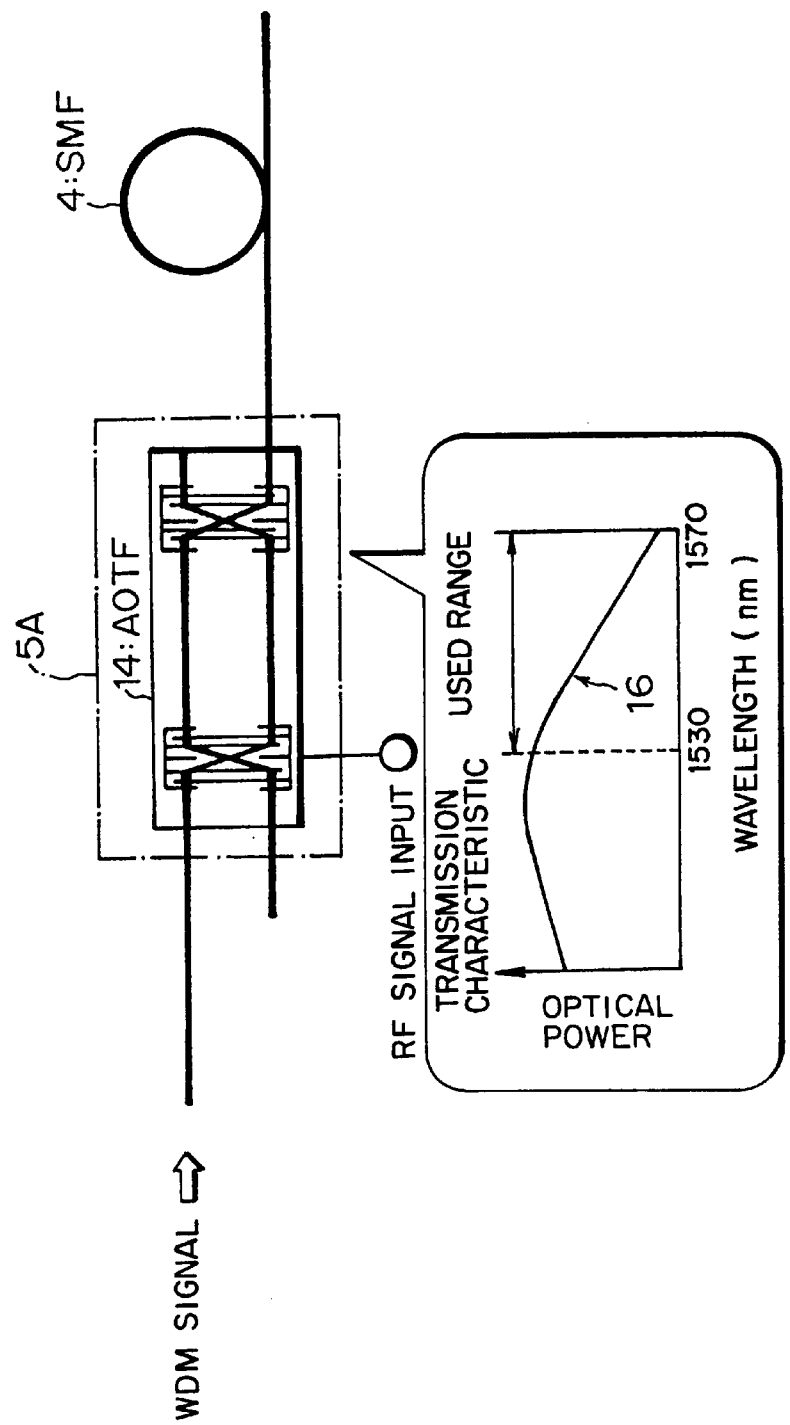
FIGS. 13 and 14 are block diagrams showing a structure of the loss difference compensating device using an AOTF according to the first embodiment.

Still alternatively, the above optical equalizing filter 5A can be realized with an acousto-optic tunable filter (AOTF) 14, as shown in FIG. 13, for example. The AOTF 14 is a filter being capable of selecting (transmitting) lights at a wavelength λi corresponding to an RF signal when the RF signal having a certain frequency is inputted, and controlling the transmittance by controlling a power of the inputted RF signal. By inputting a plurality of RF signals, it is possible to control transmittance of lights at a plurality of wavelengths λi.

When the AOTF 14 is used as the loss difference compensating device 5A, a half width of the transmission characteristic is widen (refer to a reference numeral 15 in FIG. 13) and a shoulder (refer to a reference numeral 16 in FIG. 13) of the transmission characteristic is used, thereby forming a filter whose transmission characteristic is tilted (diffuse-cutting filter). In order to freely change a tilt of the transmission characteristic, an RF signal having a frequency according to the above change is inputted, separately from the RF signal having a center frequency forming the above transmission characteristic.

At this time, if an RF signal having a frequency close to the above center frequency is inputted, coherent beat noises may be generated. For this, the AOTF 14 is configured such as to be able to select wavelengths in some propagation modes and an RF signal away from the center frequency to a certain extent is inputted (exciting in different modes). Using such characteristic of the AOTF 14, it is possible to realize the loss difference compensating device 5A having a desired transmission characteristic.

Figure 14:
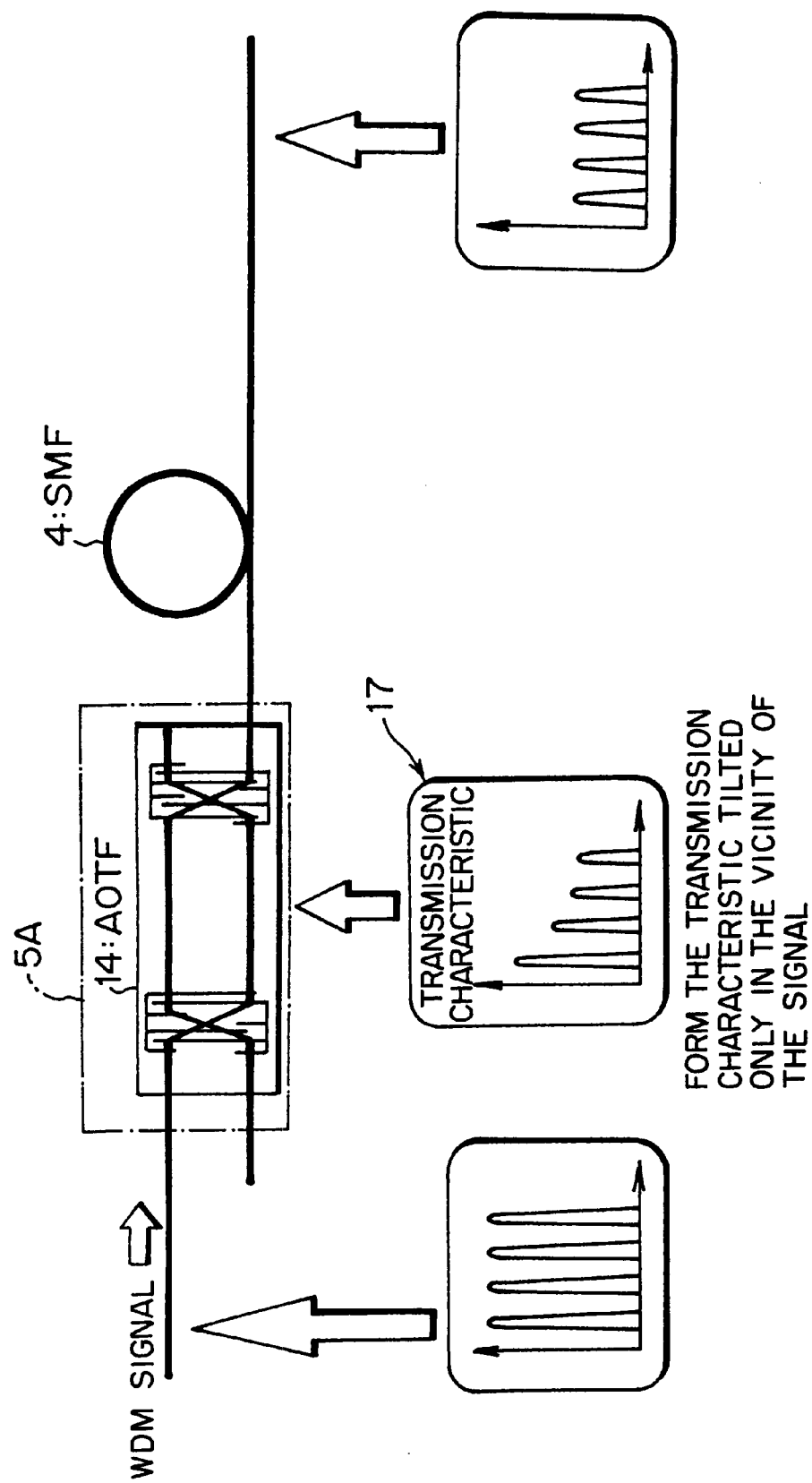

Since the AOTF 14 can simultaneously control transmission of optical signals at a plurality of wavelengths by inputting a plurality of RF signals, the transmission characteristic (refer to a reference numeral 17 in FIG. 14) is formed only in the vicinity of a used wavelength band (1530 nm to 1570 nm, for example) to give a desired tilt, whereby the above loss difference compensating device 5A is realized.

Since the transmittance of the AOTF 14 can be freely controlled by changing a power of the inputted RF signal, the AOFT 14 can adjust itself to an arbitrary transmission distance L by changing a power of the inputted RF signal to change the transmittance of the AOFT 14, even if the transmission distance L of the WDM signals is changed and the tilt characteristic of a loss difference is changed. Therefore, it is possible to compensate a loss difference according to an arbitrary transmission distance L only by the AOTF 14 without a filter whose transmission characteristic is most suitably designed according to the transmission distance L, so as to decrease the number of types of the loss difference compensating device 5A to be prepared, as will be described later.

In the WDM transmission system 1A according to this embodiment, the SMF 4 is provided with the optical equalizing filter (loss difference compensator) 5A having the loss difference compensation characteristic (transmission characteristic) according to the transmission distance L in order to compensate a loss difference of an optical signal at each wavelength λi generated according to the transmission distance (a length of the SMF 4) L of the WDM signal due to the wavelength-dependent transmission loss characteristic of the SMF 4, so that the loss characteristic of the whole transmission line (the whole system) between the optical transmitting apparatus 2 and the optical receiving apparatus 3 becomes independent of wavelength.

It is therefore possible to always suppress a variation in receiving level at each wavelength λi to a minimum so that the system 1A which can transmit the WDM signal in a wide wavelength band for a long distance is readily realized, and thus serviceability of various communications using WDM transmission is largely improved.

Particularly, the above loss difference noticeably appears when a WDM signal (whose used wavelength band is 12 nm or more), in which optical signals at 16 wavelengths are wavelength-division-multiplexed, centered at a 1.55 μm band, and cannot be ignored depending on the transmission distance L. For this, in order to realize future transmission of a WDM signal in which optical signals at 32 wavelengths or more are wavelength-division-multiplexed, the loss difference compensation by the above optical equalizing filter 5A is extremely effective.

In concrete, the above optical equalizing filter 5A is configured with the FBGs 7 or 7', the etalon filter 12, the dielectric multilayer filter 13 or the like to have the loss difference compensation characteristic (transmission characteristic) according to a transmission stance L of the WDM signal so that the above loss difference compensation is realized only by installing the optical equalizing filter 5A to the SMF 4 without any special control such as pre-emphasis or the like to be described later. This contributes to simplification of the system 1A.

Figure 15:
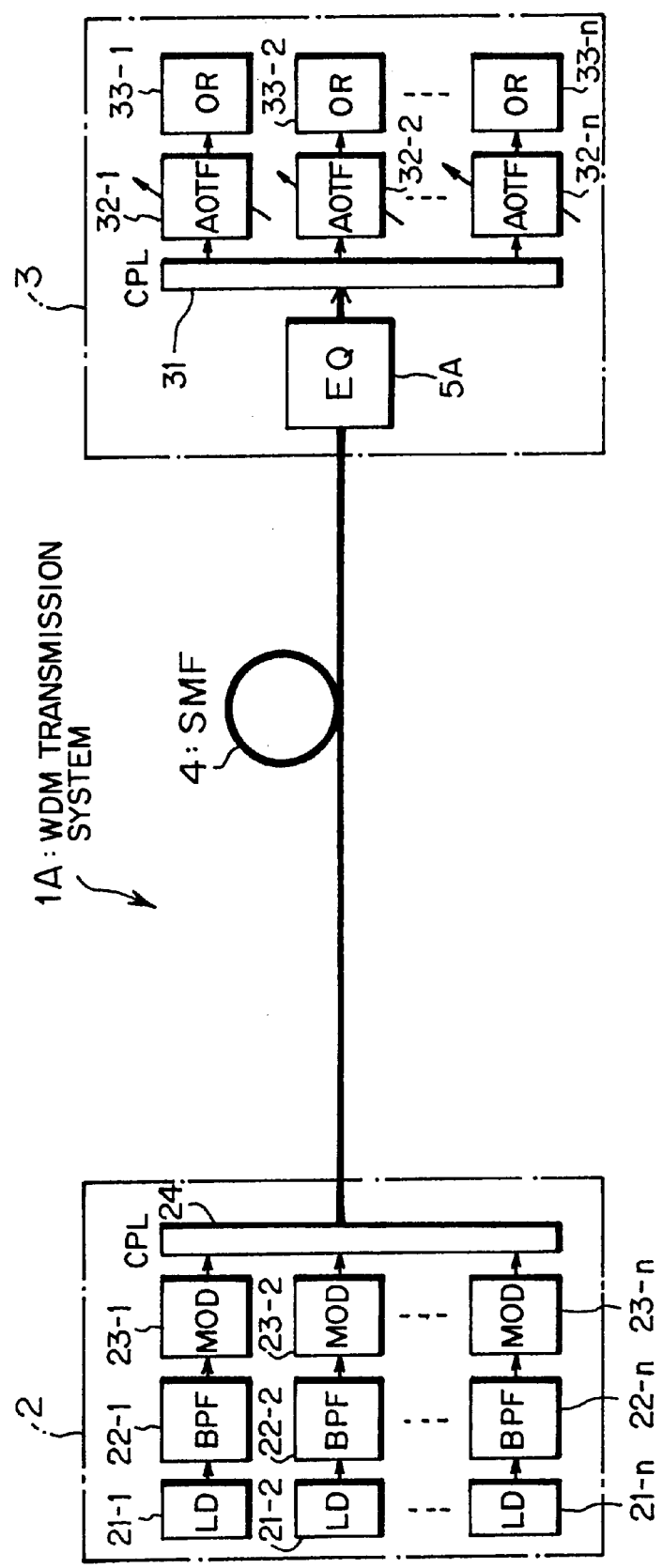
FIG. 15 is a block diagram showing another structure of the wavelength-division multiplexing (WDM) transmission system according to the first embodiment.

Although the above optical equalizing filter 5A may be disposed in any portion within the system 1A (for example, may be disposed in an outputting unit 4B of the SMF 4 in the optical receiving apparatus 3 as shown in FIG. 15), it is desirable to dispose the optical equalizing filter 5A in an inputting unit 4A of the SMF 4 in the optical transmitting apparatus 2 as shown in FIG. 1 since the SMF 4 has a non-linear effect and an input power of the WDM signal is limited (0 to +3 dB, for example).

Namely, assuming that a loss of the optical equalizing filter 5A itself (without wavelength dependency) is +1 dB, so long as a power of the WDM signal at an output of the optical coupler 24 is within a range of +1 to +4 dB, a power of the WDM signal is within an appropriate range of an input to the SMF because of a loss of the optical filter 5A itself. Therefore, there is no need of decreasing a power of the WDM signal using an optical attenuator or the like.

Since a loss difference generated due to the wavelength-dependent transmission loss characteristic of the SMF 4 is varied according to a length (a transmission distance of the WDM signal) L of the SMF 4 as stated above, it is necessary to most suitably design the compensation characteristic of the used loss difference compensating device 5A, correspondingly thereto. However, it is very difficult to design the compensation characteristic of all the loss difference compensating devices 5A indivisually according to a length L of the SMF 4.

Figure 16:
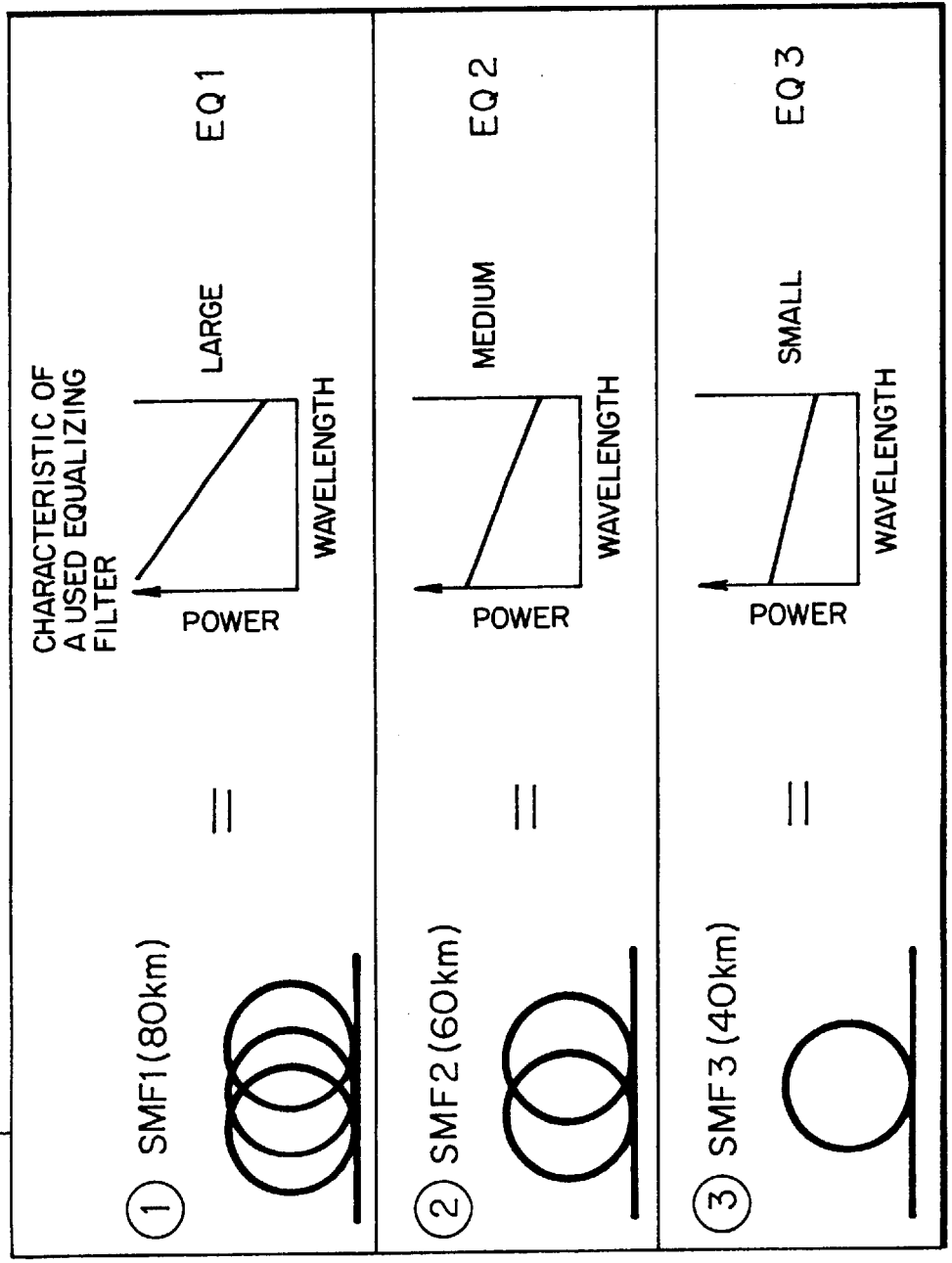
FIG. 16 is a diagram for illustrating a method for classifying types of the loss difference compensating device in a menu according to the first embodiment.

According to this embodiment, as shown in FIG. 16, types of the loss difference compensation characteristic (transmission characteristic) of the loss difference compensating device 5A to be used in the WDM transmission system 1A are classified (in a menu) according to a transmission distance (a length of the SMF 4) of the WDM signal such as for 40 km, 60 km, 80 km and so on.

In other words, here is prepared a menu table 18A in which information on the loss difference compensation characteristic of the loss difference compensating device (optical equalizing filter) 5A which can compensate the above loss difference generated in the WDM signal according to a length of the SMF 4 due to the wavelength-dependent loss characteristic of the SMF 4 is classified, correspondingly to information on the SMF 4 as an optical device to be used in the WDM transmission system 1A.

It is thereby possible to decrease (suppress to a minimum) the number of types of the optical equalizing filter 5A to be used (designed) in the system 1A.

When the WDM transmission system 1A is configured, the transmission characteristic corresponding to the SMF 4 (a length of the SMF 4) to be used in the WDM transmission system is selected on the basis of the menu table 18A to design the optical equalizing filter 5A having the selected transmission characteristic. It is thereby possible to fabricate the optical equalizing filter 5A according to the used SMF 4 in large volumes, thus to decrease a manufacturing cost of the optical equalization filter 5A. It is further possible to decrease a cost of the WDM transmission system 1A to be configured, as well.

If the WDM transmission system 1A is configured using the optical equalizing filter 5A designed as above., it is possible to configure the WDM transmission system 1A being capable of compensating a loss difference of an optical signal at each wavelength $\lambda i$ generated by the used SMF 4, quite readily and at a low cost.

When making the above menu, if the transmission characteristic of the optical equalizing filter 5A is classified for 40 km to 59 km, 60 km to 79 km, 80 km to 99 km and so on, for example, to increase a range of the transmission distance L which can be covered by the transmission characteristic of one type of the optical equalizing filter 5A, it is possible to decrease the number of types of the necessary optical equalizing filter 5A.

In making the above menu, there are a demand to decrease the number of the types, a demand to increase the number of items of length of the SMF 4 in order to flexibly configure the system, a requirement to flatten loss differences to a level where no problem occurs with respect to the transmission characteristic, which are in relation of trade-off. Therefore, there is an optimum number of the combinations in the menu. Accordingly, the item of the SMF 4 is not necessarily for each 20 km.

(B) Description of a Second Embodiment

Figure 17:
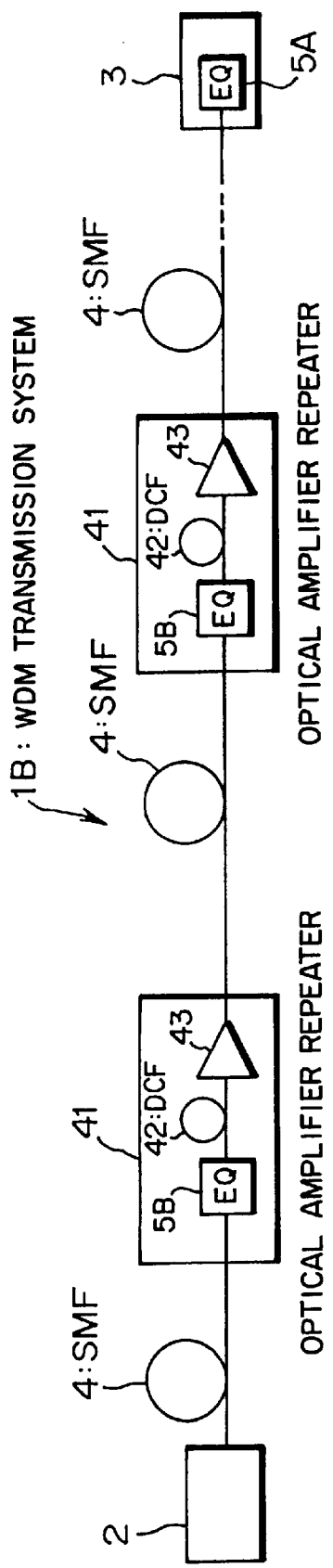
FIG. 17 is a block diagram showing a structure of a wavelength-division multiplexing (WDM) transmission system according to a second embodiment of this invention.

FIG. 17 is a block diagram showing a wavelength-division multiplexing (WDM) transmission system according to a second embodiment of this invention. A WDM transmission system 1B (hereinafter, referred to as merely a system 1B, occasionally) shown in FIG. 17 has, along with an optical transmitting apparatus 2 and an optical receiving apparatus 3 both similar to those according to the first embodiment, optical amplifier repeaters 41 each for optically amplifying and repeating a WDM signal from the optical transmitting apparatus 2, in which SMFs 4 connect the optical transmitting apparatus 2 to the optical amplifier repeater 41, the optical amplifier repeater 41 to the optical amplifier repeater 41, and the optical amplifier repeater 41 to the optical receiving apparatus 3, respectively.

In the second embodiment, a WDM signal, in which optical signals at 16 or more wavelengths are wavelength-division-multiplexed, has a wavelength band of 12 nanometer or more centered at a 1.55 micrometer band, similarly to the first embodiment.

In the optical amplifier repeater 41 of this embodiment, there are provided a dispersion compensation fiber (DCF: dispersion compensator) 42, an optical amplifier 43 and the like, as shown in FIG. 17.

The DCF 42 compensates dispersion (dispersion degradation) generated in the WDM signal due to the dispersion characteristic of the SMF 4, which is generally configured with an optical fiber made of a material (silica glass or the like) equivalent to that of the SMF 4. The DCF 42 is provided when a transmission distance [a repeat section (a length of the SMF 4) in this case] is long (more than several tens kilometer or more), or when a transmission rate is high (about 10 Gb/s, for example) since the above dispersion degradation becomes not negligible.

The optical amplifier repeater 43 amplifies a transmitting power of a received WDM signal to a power required to transmit the WDM signal to the next optical amplifier repeater 41. As the optical amplifier repeater 43, an optical amplifier of an erbium doped fiber type (EDFA) is used, for example. Provided that the optical amplifier 43 is designed such that an amplification (gain) characteristic thereof is flat independent of wavelength using a gain equalizer or the like (that is, a gain characteristic thereof does not depend on the wavelength $\lambda i$).

Meanwhile, a quantity of dispersion of the SMF 4 and a quantity of dispersion compensation of the DCF 42 required for the quantity of dispersion of the SMF 4 are in one-to-one relation. Accordingly, once a length of the used SMF 4 is determined, a required quantity of the DCF 42 is primarily determined (for example, the DCF 42 with −1500 ps/nm is used for 80 km of the SMF 4). The DCF 42 has a wavelength-dependent transmission loss characteristic similar to that of the SMF 4 since the DCF 42 is made of a material equivalent to that of the SMF 4. Therefore, a loss difference generated by the SMF 4 and the DCF 42 in each repeat section can be estimated to a certain degree.

According to this embodiment, a loss difference compensating device 5B is provided to each of the SMFs 4 in the optical amplifier repeater 41 to compensate a loss difference of an optical signal at each wavelength $\lambda i$ generated in the WDM signal due to the wavelength-dependent transmission loss characteristic of the SMF 4 and the wavelength-dependent transmission loss characteristic of the DCF 42 in each repeat section.

Namely, the loss difference compensating device 5B of this embodiment collectively compensates the loss differences generated due to the transmission loss characteristic of both of the SMF 4 and DCF 42 in each repeat section, so that the loss characteristic of the whole transmission line (the whole system) may be independent of wavelength in this embodiment. Note that since the DCF 42 is not provided in the last repeat section in FIG. 17, the loss difference compensating device 5A described before in the first embodiment. is provided in the optical receiving apparatus 3.

In concrete, the above loss difference compensating device 5B is so configured as to have the loss difference compensation characteristic according to a transmission distance (a transmission distance of the WDM signal) in a repeat section in order to compensate a loss difference which is a sum of a loss difference generated by the SMF 4 and a loss difference generated by the DCF 42 in a transmission distance of each repeat section.

The above loss difference compensation characteristic can be realized by most suitably designing the wavelength transmission characteristic (refer to FIG. 18) of the loss difference compensating device 5B using the FBG 7 of a light reflection type, the FBG 7' of a light transmission type (refer to FIGS. 2 and 7), the etalon filter 12 (refer to FIGS. 10 and 12), the dielectric multilayer filter 13 (refer to FIG. 11), the AOTF 14 (refer to FIGS. 13 and 14) or the like.

If the optical equalizing filter 5 is configured with the FBG 7 of a reflection type (refer to FIG. 2), the DCF 42 is disposed in the optical fiber 8 connected to the optical circulator 6 and the FBG 7 is formed beyond the DCF 42. In which case, it is possible to decrease a required quantity of the DCF to a half since the WDM signal passes through the DCF 42 twice.

The above loss difference compensating device 5B may be disposed in any position in the SMF 4, basically. However, it is desirable to dispose the loss difference compensating device 5B in the pre-stage of the DCF 42 since an input power to-the DCF 42 has generally the upper limit and it is necessary to prevent the input power of the WDM signal to the DCF 42 from exceeding the upper limit. whereby, consideration on degradation due to a loss by the optical equalizing filter 5B in the system becomes unnecessary.

Even if the optical amplifier 43 can amplify the power to +5 dBm per one channel (ch), it is necessary to decrease an input power to the DCF 42 to +1 dBm/ch. It is therefore necessary to take the trouble to decrease an excited light power to decrease the input power to the DCF 42. However, if the optical equalizing filter 5B whose loss is 3 dBm is disposed in the pre-stage of the DCF 42, there is no need of considering a loss: caused by inserting the optical equalizing filter 5B in the system, only by making an output of the optical amplifier 43 be 1+3=4 (dBm/ch).

Figure 18:
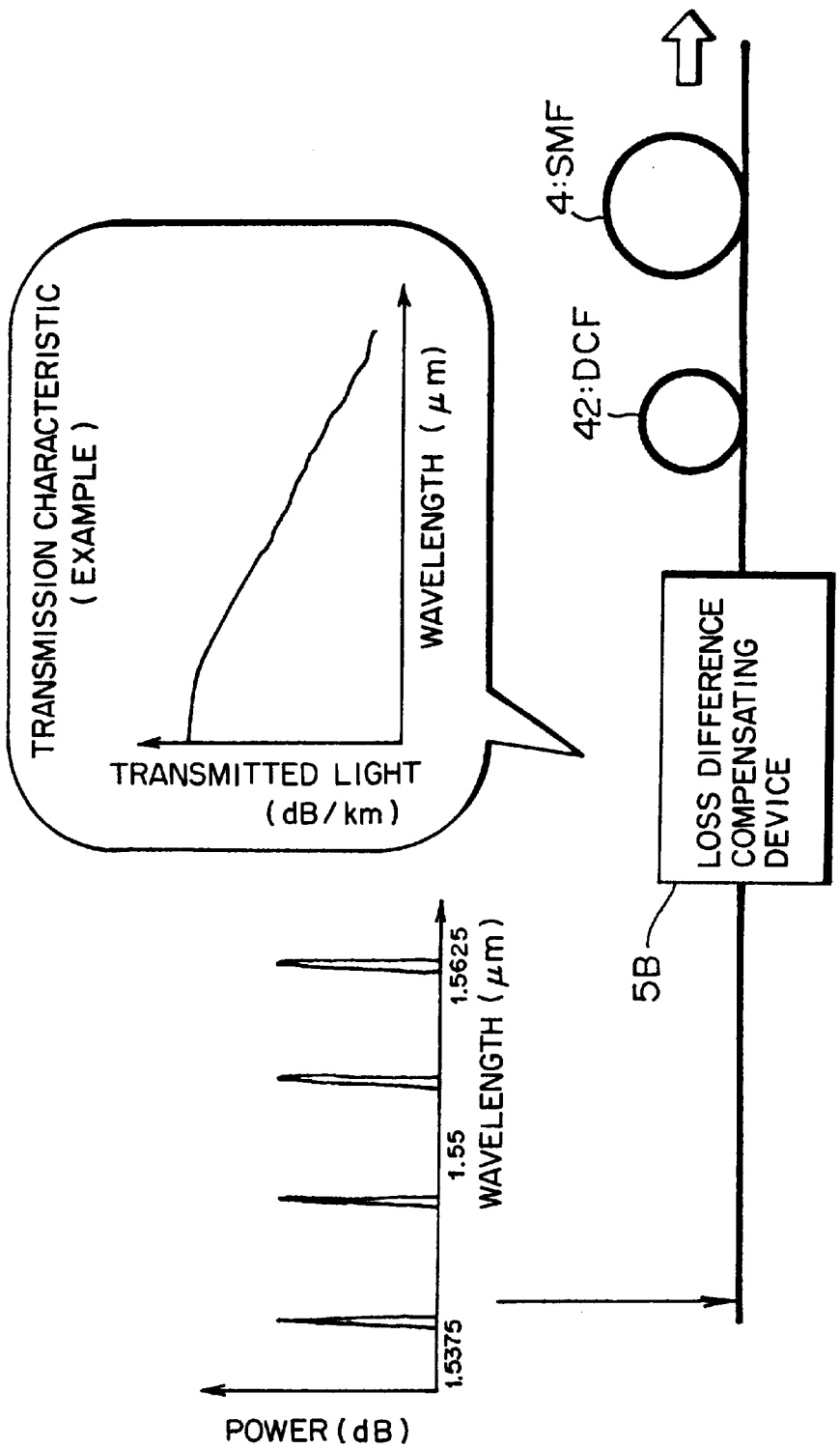
FIG. 18 is a block diagram showing a structure of an essential part of the WDM transmission system according to the first embodiment.
Figure 19:
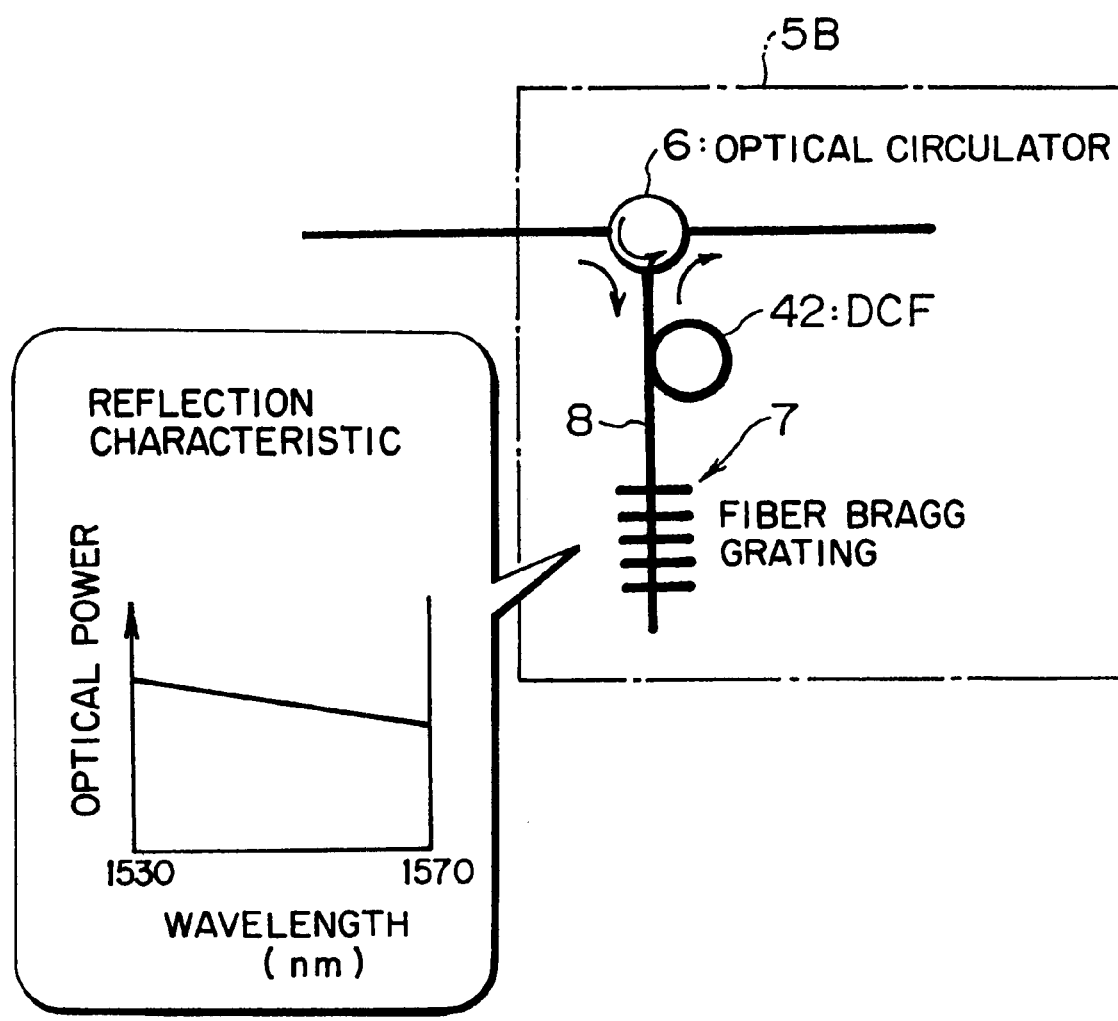
FIG. 19 is a block diagram showing a structure of a loss difference compensating device using a FBG of a light reflection type according to the second embodiment.
Figure 20:
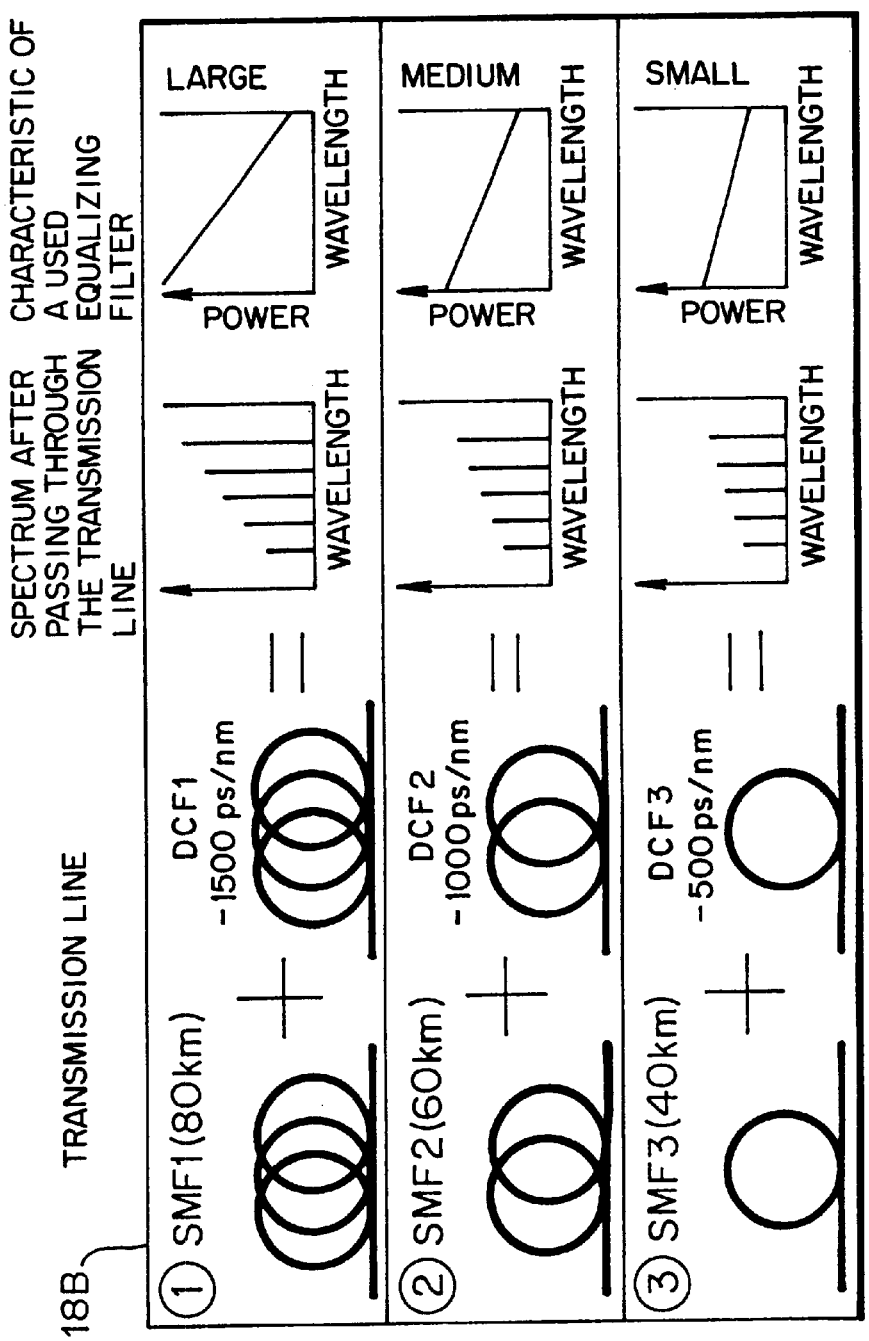
FIG. 20 is a diagram for illustrating a method of classifying types of the loss difference compensating device in a menu according to the second embodiment.

Namely, as shown in FIGS. 17 and 18, if the optical equalizing filter 5B is disposed in the pre-stage of the DCF 42, it is possible to suppress a power of the WDM signal in the pre-stage of the DCF 42, and to further avoid a phenomenon that an adverse effect is exerted on the dispersion compensation since an input power of the WDM signal to the DCF 42 is too large, without providing an exclusive circuit for suppressing the power of the WDM signal. It is therefore possible to achieve stable dispersion compensation and stable loss difference compensation to the WDM signal, which largely contributes to an improvement of reliability of the system.

In the WDM transmission system according to the second embodiment, the optical equalizing filter 5B having the loss difference compensation characteristic (transmission characteristic) according to the SMF 4 and the DCF 42 (a transmission distance) is provided to the SMF 4 in each repeat section in order to compensate a loss difference of an optical signal at each wavelengths $\lambda i$ generated in the WDM signal due to the wavelength-dependent transmission loss characteristic of each of the SMF 4 and DCF 42 in each repeat section, thereby cancelling (compensating) the above loss difference generated in the WDM signal by the SMF 4 and the DCF 42 in each repeat section, and allowing the loss characteristic of the whole transmission line (the whole system) between the optical transmitting apparatus 2 and the optical receiving apparatus 3 to be independent of wavelength.

Even in the system 1B of a type compensating dispersion of the SMF 4 using the DCF 42 in each repeat section, it is possible to always suppress a variation in receiving level at each wavelength to a minimum, thus to transmit the WDM signal in a higher signal quantity for a long distance. In this case, it is possible to largely improve serviceability of various communications using WDM transmission.

In this embodiment, the above loss difference noticeably appears when a WDM signal (whose used wavelength band is 12 nm or more), in which optical signals at 16 wavelengths or more are wavelength-division-multiplexed, centered at 1.55 $\mu$m band, and cannot be neglected depending on a transmission distance of the WDM signal. Accordingly, the loss difference compensation by the above optical equalizing filter 5B is extremely effective for the purpose of realizing a future transmission of a WDM signal in which optical signals at 32 wavelengths or more are wavelength-division-multiplexed.

The above optical equalizing filter 5B is so configured as to have the loss difference compensation characteristic (transmission characteristic) according to a transmission distance (SMF4+DCF 42) of the WDM signal, using the FBG 7 or 7', the etalon filter 12, the dielectric multilayer filter 13 or the like. It is therefore possible to realize the above loss difference compensation only by disposing the optical equalizing filter 5B in the SMF 4 without a special control such as pre-emphasis to be described later or the like, which largely contributes to simplification of the WDM transmission system 1B.

Incidentally, a loss difference generated by the SMF 4 may be compensated separately from a loss difference generated by the DCF 42 (namely, an optical equalizing filter 5B for the SMF 4 and an optical filter 5B for the DCF 42 are separately provided). However, the collective compensation of the loss differences generated by the SMF 4 and the DCF 42 in each repeat section as described above is more economical, by which the optical amplifier repeater 45 may be decreased in size and an insertion loss of the optical equalizing filter 5B may be decreased.

Since a loss difference generated due to the wavelength-dependent transmission loss characteristic of each of the SMF 4 and the DCF 42 is varied according to a length of the SMF 4 as described above, it is necessary to most suitably design, according to the loss difference, the loss difference compensation characteristic of the loss difference compensating device 5B to be used. According to this embodiment, lengths of the SMF 4 are classified in a menu, along with types of the DCF 42 and types of the loss difference compensating device 5B to be used in each repeat section.

Namely, there is prepared a menu table 18B in which information on the loss difference compensation characteristic (wavelength transmission characteristic) of the loss difference compensating device (optical equalizing filter) 5B which can compensate the above loss difference generated in the WDM signal due to the wavelength-dependent loss characteristic of the SMF 4 and the wavelength-dependent loss characteristic of the DCF 42 is classified correspondingly to information on the SMF 4 and the DCF 42 used as optical devices in the WDM transmission system.

In this case, it is thereby possible to decrease (suppress to a minimum) the number of types of the optical equalizing filter 5B to be used (designed) in the system 1B.

When the WDM transmission system 1B is configured, the transmission characteristic corresponding to the SMF 4 (a length of the SMF 4) and the DCF 42 to be used in the WDM transmission system is selected on the basis of the menu table 18B, and the optical equalizing filter 5B having the selected transmission characteristic is designed. It is thereby possible to fabricate in large volumes the optical equalizing filter 5B according to the used SMF 4 and DCF 42.

Accordingly, a manufacturing cost of the optical equalizing filter 5B can be decreased, further a cost of the WDM transmission system to be configured can be decreased. In this case, it is unnecessary to most suitably design the gain characteristic of the optical amplifier 43 for each length of the SMF 4 since it is only necessary to design the optical amplifier 43 so as to have a flat gain characteristic. The number of types of the optical amplifier 43 is thus also decreased.

If the optical equalizing filter 5B designed as above is used to configure the WDM transmission system 1B, it is possible to configure the WDM transmission system 1B which can compensate a loss difference of an optical signal at each wavelength λi generated by the used SMF 4 and DCF 42, quite easily and at a low cost. According to this embodiment, the above classification in the menu is for each predetermined section (repeat section) so that the system can be flexibly configured according to needs of the user.

In this case, types of the transmission characteristic of the optical equalizing filter 5A are classified as for 40 km to 59 km, 60 km to 79 km, 80 km to 99 km and so on, for example, to widen a range of the transmission distance L that the transmission characteristic of one type of the optical equalizing filter 5A can comply, whereby the number of types of the necessary optical equalizing filter 5A is decreased. As to the item of the SMF 4, it is unnecessary to always classify types of the SMF for each 20 km as above.

(C) Description of a Third Embodiment

Figure 21:
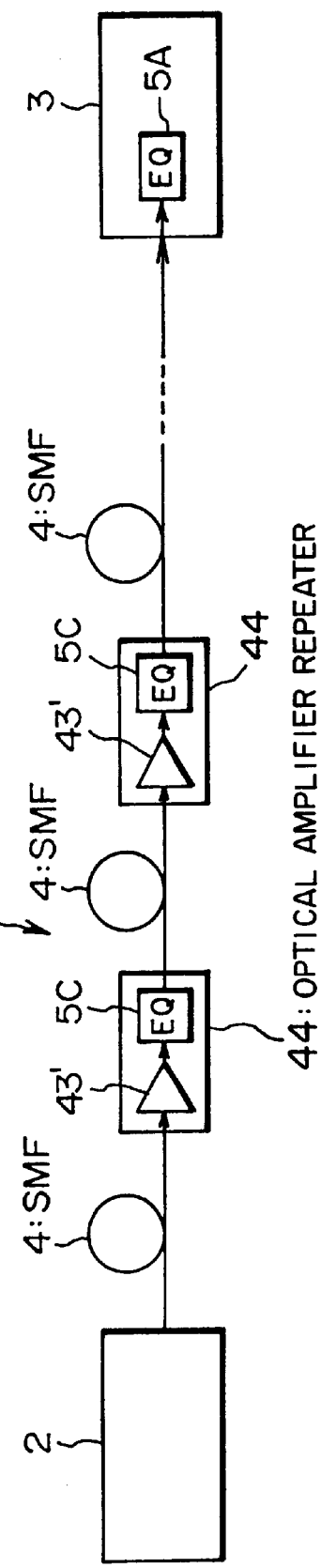
FIG. 21 is a block diagram showing a structure of a wavelength-division multiplexing (WDM) transmission system according to a third embodiment of this invention.

FIG. 21 is a block diagram showing a wavelength-division multiplexing (WDM) transmission system according to a third embodiment of this invention. A WDM transmission system 1C shown in FIG. 21 has, along with an optical transmitting apparatus 2 and an optical receiving apparatus 3 similar to those described in the first embodiment, optical amplifier repeaters 44 each for optically amplifying and repeating a WDM signal from the optical transmitting apparatus 2, in which SMFs 4 connect the optical transmitting apparatus 2 to the optical amplifier repeater 44, the optical amplifier 44 to the optical amplifier 44, and the optical amplifier 44 to the optical receiving apparatus 3, respectively.

In the third embodiment, the WDM signal is assumed to have a wavelength band of 12 nanometer or more centered at a 1.55 micrometer band, in which optical signals at 16 wavelength or more are wavelength-division-multiplexed, similarly to the first embodiment.

As shown in FIG. 21, the optical amplifier repeater 44 of this embodiment has an optical amplifier 43', a loss difference compensator (EQ) 5C (hereinafter, referred as a loss difference compensating device 5C or an optical equalizing filter 5C, occasionally), and the like. Incidentally, the DCF 42 as described in the second embodiment is not provided in the optical amplifier repeater 44. Namely, the WDM transmission system 1C shown in FIG. 21 is applicable to a case where a repeat section is short (several kilometers) or a transmission rate of the WDM signal is small (2.5 Gb/s or less, for example) so that dispersion of the SMF 4 is not required to be compensated by the DCF 42.

Figure 22:
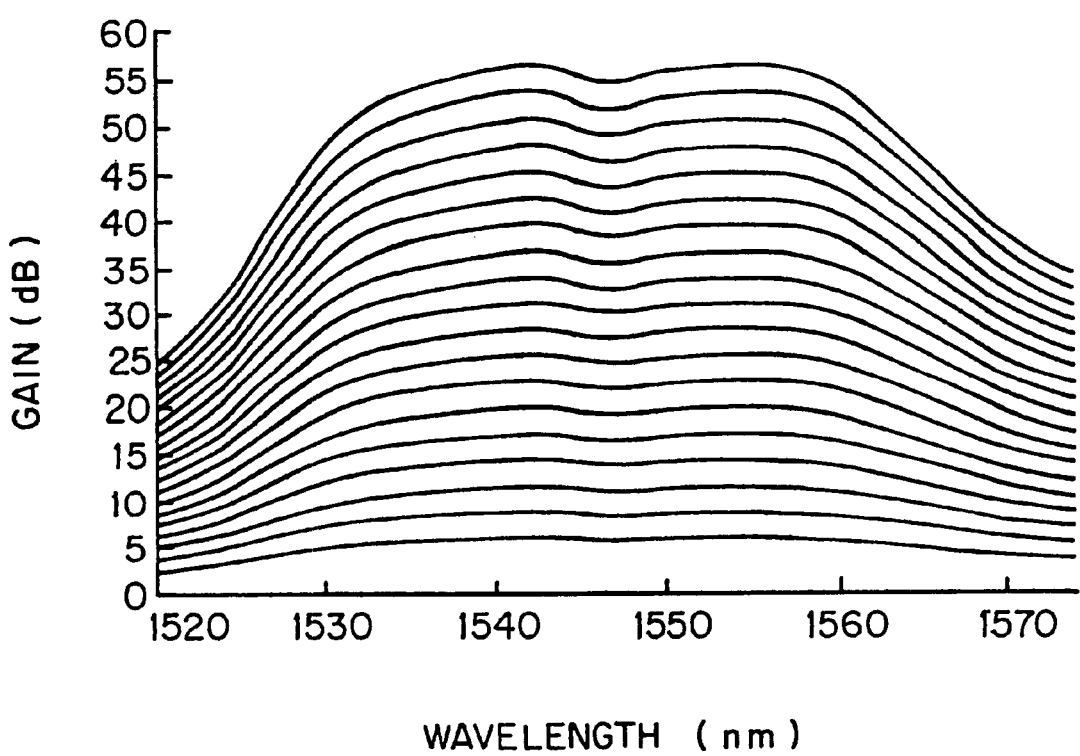
FIG. 22 is a diagram showing an example of a gain characteristic of an optical amplifier according to the third embodiment.

The optical amplifier 43' amplifies a transmitting power of the received WDM signal to a power required to transmit the WDM signal to the next optical amplifier repeater 44, similarly to the first embodiment. An optical amplifier of an erbium doped fiber (EDFA), for example, is used as the optical amplifier 43'. Unlike the optical amplifier 43 described in the second embodiment, the optical amplifier 43' is not most suitably designed such that the amplification (gain) characteristic thereof is wavelength-independent, but has a wavelength-dependent gain (loss) characteristic, as shown in FIG. 22, for example. A plurality of gain characteristics shown in FIG. 22 each represents a characteristic according to a length of a used erbium doped fiber (a longer erbium doped fiber has a higher gain).

The loss difference compensating device 5C is disposed in the SMF 4 to compensate a loss difference of an optical signal at each wavelength λi generated in the WDM signal due to the wavelength-dependent transmission loss characteristic of the SMF 4 and the wavelength-dependent loss characteristic of the optical amplifier 43'.

Namely, the loss difference compensating device 5C of this embodiment collectively compensates loss differences in the WDM signal due to the wavelength-dependent loss characteristic of each of the SMF 4 and the optical amplifier 43' in each repeat section, in consideration of the wavelength-dependent loss characteristic of both of the SMF 4 and the optical amplifier 43'. Whereby, the loss characteristic of the whole transmission line (the whole system) is made wavelength-independent in this embodiment. Note that the loss difference compensating device 5A described in the first embodiment is disposed in the optical receiving apparatus 3 since no optical amplifier 43' is disposed in the last repeat section in FIG. 21.

In concrete, once a length of the SMF 4 (a repeat distance) is determined, a required gain characteristic of the optical amplifier 43' is primarily determined so that a loss difference that is a sum of a loss difference generated by the SMF 4 and a loss difference generated by the optical amplifier 43' is determined for a distance of each repeat section. The above loss difference compensating device 5C has thus the loss difference compensation characteristic according to a transmission distance (a repeat distance, in this case) of the WDM signal so as to compensate the loss difference.

The loss difference compensation characteristic can be realized by most suitably designing the wavelength transmission characteristic of the loss difference compensating device 5C (refer to FIG. 18), using the FBG 7 of a light reflection type, the FBG 7' of a light transmission type (refer to FIGS. 2 and 7), the etalon filter 12 (refer to FIGS. 10 and 12), the dielectric multilayer filter 13 (refer to FIG. 11), the AOTF 14 (refer to FIGS. 13 and 14), or the like, as described in the first embodiment.

In the WDM transmission system 1C according to the third embodiment, the optical equalizing filter 5C having the loss difference compensation characteristic (transmission characteristic) that can compensate a loss difference of an optical signal at each wavelength λi generated in the WDM signal due to the wavelength-dependent loss characteristic of each of the SMF 4 and the optical amplifier 43' is disposed in the SMF 4 in each repeat section, whereby the loss differences generated by the SMF 4 and the optical amplifier 43' are collectively cancelled in each repeat section.

Therefore, the loss characteristic of the whole transmission line between the optical transmitting apparatus 2 and the optical receiving apparatus 3 can be wavelength-independent. Even in the system 1C appropriately amplifying the WDM signal by the optical amplifier repeater 44 and transmitting the same, it is possible, in this case, to always suppress a variation in receiving level at each wavelength to a minimum, and thus largely improve serviceability of various communications using the WDM transmission.

In this embodiment, the loss difference compensation by the above optical equalizing filter 5C is extremely effective in consideration of future transmission of a WDM signal in which optical signals at 32 wavelengths or more are wavelength-division-multiplexed since the above loss difference noticeably appears in the case where a WDM signal (whose used wavelength band is 12 nm or more) centered at a 1.55 μm band in which optical signals at 16 wavelengths or more are wavelength-division multiplexed is transmitted and cannot be negligible depending on a transmission distance of the WDM signal.

The above optical equalizing filter 5C is such designed as to have the loss difference compensation characteristic (transmission characteristic) according to a transmission distance (a repeat distance, here) of the WDM signal using the FBG, 7 or 7', the etalon filter 12, the dielectric multilayer filter 13 or the like. It is therefore possible to realize the above loss difference compensation only by disposing the optical equalizing filter 5C in the SMF 4 without a special control such as pre-emphasis or the like, which contributes to simplification of the WDM transmission system 1C.

Figure 23:
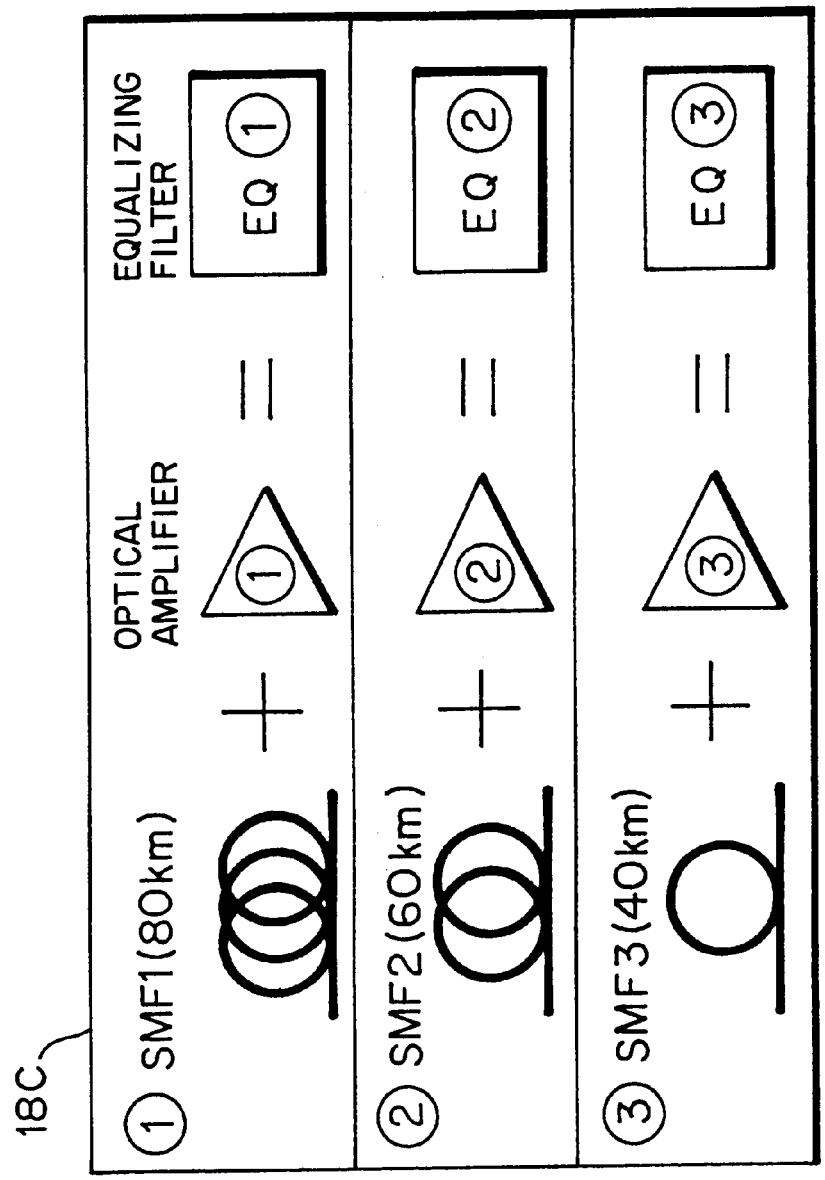
FIG. 23 is a diagram for illustrating a method for classifying types of the loss difference compensating device in a menu according to the third embodiment of this invention.

Meanwhile, the above loss difference generated due to the wavelength-dependent loss characteristic of each of the SMF 4 and the optical amplifier 43' is varied according to a length of the SMF 4, as stated above. It is therefore necessary to most suitably design the loss difference compensation characteristic of the loss difference compensating device 5c to be used according thereto. According to this embodiment, as shown in FIG. 23, lengths of the SMF 4 are classified in a menu, along with types of the optical amplifier and types of the loss difference compensating device 5C used in each repeat section.

Namely, here is prepared a menu table 18C in which information on the loss difference compensation characteristic (transmission characteristic) of the loss difference compensating device (optical equalizing filter) 5C which can compensate the above loss difference generated in the WDM signal due to the wavelength-dependent loss characteristic of the SMF 4 and the wavelength-dependent loss characteristic of the optical amplifier 54' is classified, correspondingly to information on the SMF 4 and the optical amplifier 43' as optical devices used in the WDM transmission system.

In this case, it is possible to decrease (suppress to a minimum) the number of types of the optical equalizing filter 5C to be used (designed) in the system 1C.

When the WDM transmission system 1C is configured, the transmission characteristic corresponding to the SMF 4 (a length of the SMF 4) and the optical amplifier 43' to be used in the WDM transmission system is selected on the basis of the menu table 18C, and the optical equalizing filter 5C having the selected transmission characteristic is designed. It is thereby possible to fabricate in large volumes the optical equalizing filter 5C according to the used SMF 4 and optical amplifier 43', thus decreasing a manufacturing cost of the optical equalizing filter 5C and further decreasing a cost of the WDM transmission system to be configured.

If the optical equalizing filter 5C designed as above is used to configure the WDM transmission system 1C, it is possible to configure the WDM transmission system 1C which can compensate a loss difference of an optical signal at each wavelength λi generated by the used SMF 4 and DCF 43', quite easily and at a low cost. According to this embodiment, the above classification in the menu is for each predetermined section (repeat section) so that the system can be flexibly configured according to needs of the user.

(D) Description of a Fourth Embodiment

Figure 24:
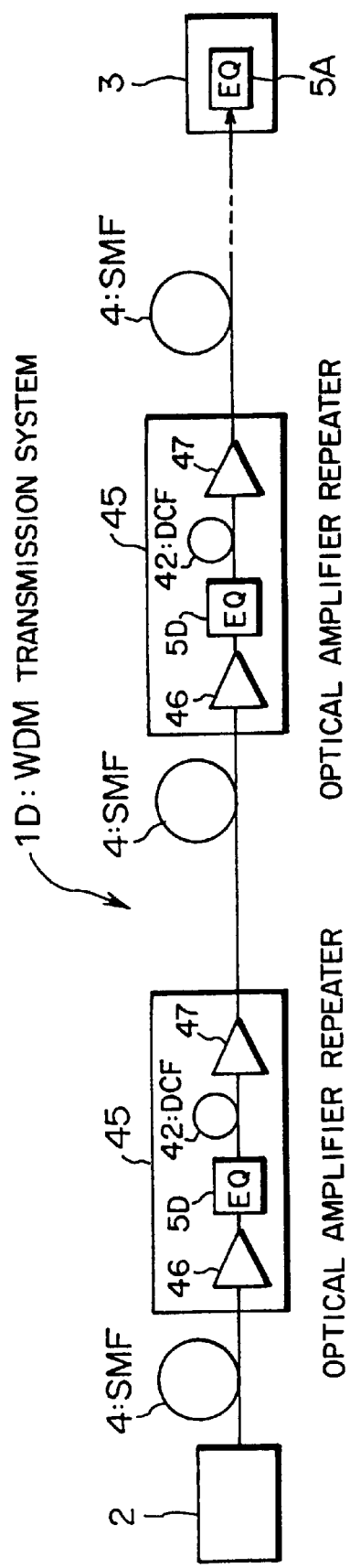
FIG. 24 is a block diagram showing a structure of a wavelength-division multiplexing (WDM) transmission system according to a fourth embodiment of this invention.

FIG. 24 is a block diagram showing a structure of a wavelength-division multiplexing (WDM) transmission system according to a fourth embodiment of this invention. A WDM transmission system 1D shown in FIG. 24 has, along with an optical transmitting apparatus 2 and an optical receiving apparatus 3 similar to those described in the first embodiment, optical amplifier repeaters 45 each for optically amplifying and repeating a WDM signal from the optical transmitting apparatus 2, in which SMFs 4 connect the optical transmitting apparatus 2 to the optical amplifier repeater 45, the optical amplifier repeater 45 to the optical amplifier repeater 45, and the optical amplifier 45 to the optical receiving apparatus 3, respectively.

According to the fourth embodiment, the WDM signal is assumed to have a wavelength band of 12 nanometer or more centered at a 1.55 micrometer band, in which optical signals at 16 wavelengths or more are wavelength-division-multiplexed, similarly to the first embodiment.

As shown in FIG. 24, the optical amplifier repeater 44 of this embodiment has an optical amplifiers 46 and 47, a loss difference compensator (EQ) 5D (hereinafter, referred as a loss difference compensating device 5D or an optical equalizing filter 5D, occasionally) and the like. Incidentally, an optical amplifier in which a DCF 42 is interposed between the optical amplifiers 46 and 47 is called an in-line optical amplifier.

The DCF 42 compensates dispersion (dispersion degradation) generated in the WDM signal due to the dispersion characteristic of the SMF 4, similarly to the second embodiment. In this case, the DCF 42 is configured with an optical fiber made of a material (silica glass or the like) equivalent to that of the SMF 4. The DCF 42 is provided in the case where a transmission distance [a repeat section (a length of the SMF 4), in this case] is long (several tens kilometers or more), or a transmission rate is high (about 10 Gb/s, for example) so that the above dispersion degradation is not negligible.

The optical amplifiers 46 and 47 amplify a transmitting power of a received WDM signal to a power required to transmit the WDM signal to the next optical amplifier repeater 45. Here, the optical amplifiers 46 and 47 are in two stages or more and the DCF 42 is interposed therebetween since the DCF 42 has a large non-linear effect so that an optical input power to the DCF 42 is limited and a loss thereof is larger than that of the SMF 4. Namely, when an in-line optical amplifier repeater is used, the SMF 4, the DCF 42 and the optical amplifiers 46 and 47 are used as one set.

Each of these optical amplifiers 46 and 47 is configured with, for example, an optical amplifier (EDFA) of an erbium doped fiber type. In this embodiment, assuming that each of the optical amplifiers 46 and 47 is not most suitably designed such that the gain characteristic thereof is flat with respect to the wavelength $\lambda i$ [that is, having a wavelength-dependent gain (loss) characteristic].

The loss difference compensting device 5D of this embodiment is disposed in the SMF 4 to compensate a loss difference of an optical signal at each wavelength $\lambda i$ generated in the WDM signal due to the wavelength-dependent transmission loss characteristic of the SMF 4 and the wavelength-dependent transmission loss characteristic of the DCF 42 and a wavelength-dependent gain loss characteristic of the optical amplifiers 46 and 47.

Namely, the loss difference compensating device 5D of this embodiment collectively compensates a loss difference in the WDM signal generated due to the wavelength-dependent loss characteristic of each of the SMF 4, the DCF 42 and the optical amplifiers 46 and 47 in consideration that the SMF 4, the DCF 42 and the optical amplifiers 46 and 47 all have the wavelength-dependent loss characteristic. Whereby, it is possible to allow the loss characteristic of the whole transmission line (the whole system) to be wavelength-independent in this embodiment. Note that, in FIG. 24, the loss difference compensating device 5A described in the first embodiment is disposed in the optical receiving apparatus 3 since the DCF 42 and the optical amplifiers 46 and 47 are not disposed in the last repeat section.

In concrete, once a length of the SMF 4 (a repeat distance) is determined, a required quantity of the DCF and the gain characteristic of the optical amplifiers 46 and 47 are primarily determined so that a loss difference that is a sum of a loss difference generated by the SMF 4, a loss difference generated by the DCF 42 and a loss difference generated by the optical amplifiers 46 and 47 in each repeat section is determined. Accordingly, the above loss difference compensating device 5D has the loss difference compensation characteristic according to a transmission distance of the WDM signal so as to compensate the above loss difference.

The loss difference compensation characteristic can be realized by most suitably designing the wavelength transmission characteristic (refer to FIG. 18) of the loss difference compensating device 5D using the FBG 7 of a light reflection type, the FBG 7' of a light transmission type (refer to FIGS. 2 and 7), the etalon filter 12 (refer to FIGS. 10 and 12), the dielectric multilayer filter 13 (refer to FIG. 11), the OATF 14 (refer to FIGS. 13 and 14) or the like, as described before in the first embodiment.

In the WDM transmission system according to the fourth embodiment, the optical equalizing filter 5C having the loss difference compensation characteristic that can compensate a loss difference of an optical signal at each wavelength $\lambda i$ generated in the WDM signal due to the wavelength-dependent loss characteristic of each of the SMF 4, the DCF 42 and the optical amplifiers 46 and 47 is disposed in the SMF 4 configuring each repeat section as described above, thereby collectively canceling the loss differences generated by the SMF 4, the DCF 42 and the optical amplifiers 46 and 47 in each repeat section.

In this case, the loss characteristic of the whole transmission line between the optical transmitting apparatus 2 and the optical receiving apparatus 3 can be wavelength-independent so that dispersion in the SMF 4 is compensated by the DCF 42 in each repeat section (optical amplifier repeater 45). Even in the system 1D transmitting the WDM signal while appropriately amplifying the same, it is possible to always suppress a variation in receiving level at each wavelength to a minimum, which leads to a large improvement of serviceability of various communications using the WDM transmission, in this case.

In this embodiment, the above loss difference noticeably appears in the case where the WDM signal (whose used wavelength band is 12 nm or more), in which optical signals at 16 waves or more are wavelength-division-multiplexed, centered at a 1.55 $\mu$m band is transmitted, and is not negligible depending on a transmission distance of the WDM signal. In consideration of realization of future transmission of a WDM signal in which optical signals at 32 wavelengths: or more are wavelength-division-multiplexed, the loss difference compensation by the above optical equalizing filter 5D is extremely effective.

The above optical equalizing filter 5D is so configured to have the loss difference compensation characteristic (transmission characteristic) according to a transmission distance (a repeat distance, here) of the WDM signal, using the FBG 7 or 7', the etalon filter 12, the dielectric multilayer filter 13 or the like. It is therefore possible to realize the above loss difference compensation only by disposing the otpical equalizing filter 5D in the SMF 4 without a special control such as pre-emphasis or the like, which contributes to simplification of the WDM transmission system 1D.

Figure 25:
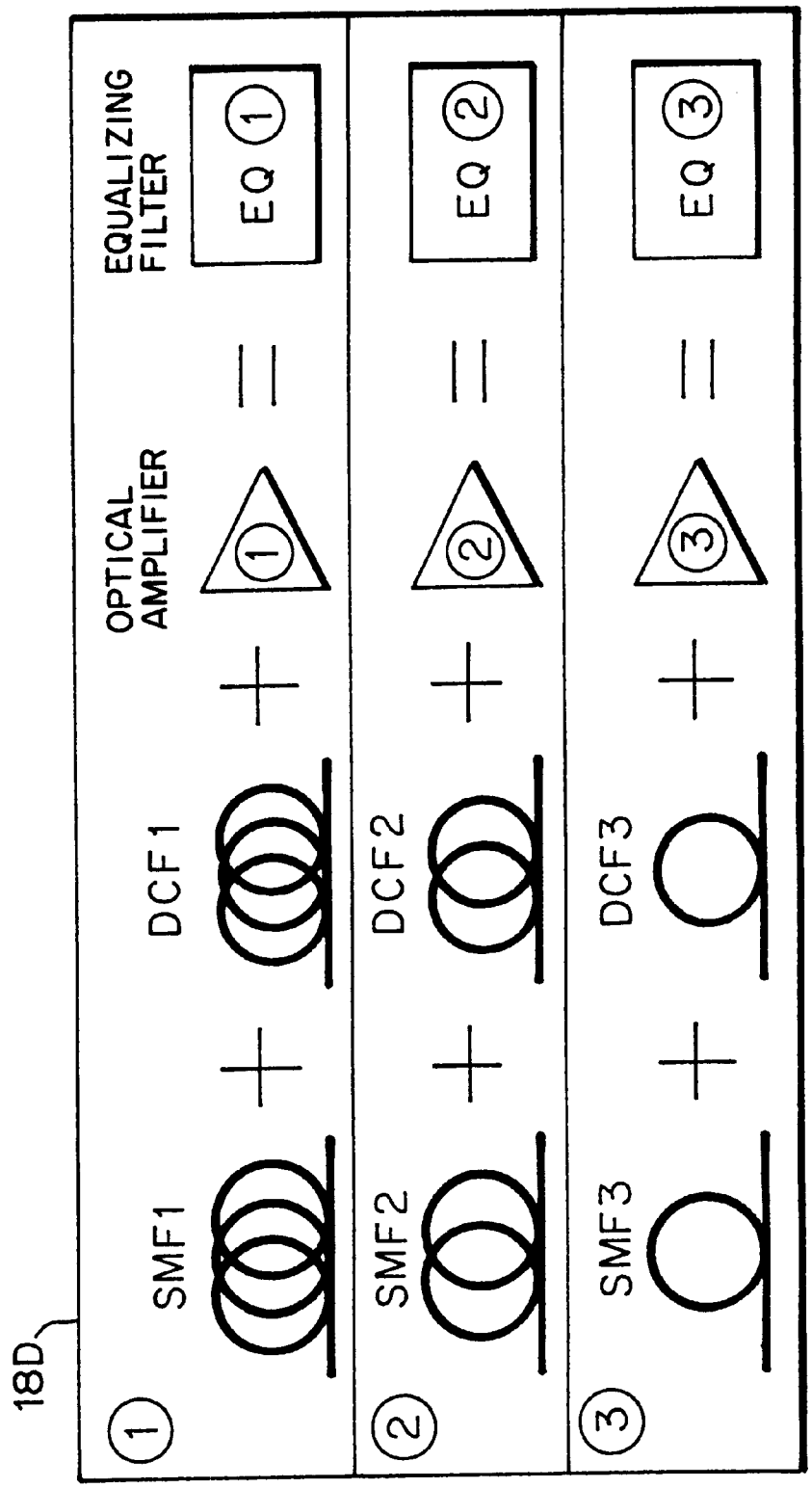
FIG. 25 is a diagram for illustrating a method for classifying types of a loss difference compensating device according to the fourth embodiment.

Since an input power to the optical amplifier repeater 45 is varied according to a used transmission line, it is necessary to most suitably design an input dynamic range, an NF and the like of the optical amplifier repeater 45. According to this embodiment, types of the optical amplifiers 45 and 46 are classified in a menu as shown in FIG. 25, in a similar manner of the classification of the SMF 4 and the DCF 42 in the menu described before. Further, the above loss difference generated due to the wavelength-dependent loss characteristic of each of the SMF 4, the DCF 42 and the optical amplifiers 46 and 47 is varied according to a length of the SMF 4, so that it is necessary to most suitably design the loss difference compensation characteristic of the loss difference compensating device 5D to be used correspondingly thereto. Types of the loss difference compensating device 5D to be used are also classified for each repeat section, as shown in FIG. 25.

Namely, here is prepared a menu table 18D in which information on the loss difference compensation characteristic (transmission characteristic) of the loss difference compensating device (optical equalizing filter) 5D which can compensate the above loss difference generated in the WDM signal due to the wavelength-dependent loss characteristic of the SMF 4, the wavelength-dependent loss characteristic of the DCF 42 and the wavelength-dependent loss characteristic of the optical amplifiers 46 and 47 is classified, correspondingly to information on the SMF 4, the DCF 42 and the optical amplifiers 46 and 47 as optical devices used in the WDM transmission system 1D.

It is thereby possible to decrease (suppress to a minimum) the number of types of the SMF 4, the DCF 42, the optical amplifiers 46 and 47 and optical equalizing filter 5D to be used (designed) in the system 1D.

When the WDM transmission system 1D is configured, the transmission characteristic corresponding to the SMF 4 (a length of the SMF 4), the DCF 42 and the optical amplifiers 46 and 47 to be used in the WDM transmission system 1D are selected on the basis of the menu table 18D, and the optical equalizing filter 5D having the selected transmission characteristic is. designed, whereby the optical equalizing filter 5D according to the used SMF 4 is fabricated in large volumes. It is therefore possible to decrease a manufacturing cost of the optical equalizing filter 5D, further decrease a cost of the WDM transmission system 1D to be configured.

If the optical equalizing filter 5D designed as above is used to configure the WDM transmission system 1D, it is possible to configure the WDM transmission system 1D being capable of compensating a loss difference of an optical signal at each wavelength λi generated by the used SMF 4, DCF 42 and optical amplifiers 46 and 47, extremely readily and at a low cost. According to this embodiment, since the above classification in the menu is done for each predetermined section (repeat section), the system can be flexibly configured according to needs of the user.

(E) Others

In each of the above embodiments, since the characteristic (tilt) of a loss difference generated in the WDM signal is varied according to a transmission distance [a length of the SMF 4 (repeat section)], the compensation characteristic of each of the loss difference compensating devices 5A through 5D is classified in the menu (that is, each of the loss difference compensating devices 5A through 5D has the compensation characteristic according to a transmission distance). However, the present invention is not limited to the above example, but the compensation characteristic of each of the loss difference compensating devices 5A through 5D may be classified in the menu according to a quality of the SMF 4, a performance of the same, a used wavelength band or the like, for example.

In each of the above second to fourth embodiments, each of the loss difference compensating device 5B, 5C or 5D is disposed in each repeat section to compensate a loss difference in each repeat section. However, it is alternatively possible to dispose only one loss difference compensating device in a certain repeat section (or, in the optical transmitting apparatus 2 or the optical receiving apparatus 3) in consideration of the number of optical devices such as the SMF 4, the DCF 42 and the like used in all repeat sections, for example, to collectively compensate wavelength-dependency of the loss characteristic of the whole transmission line.

Further, each of the above second to fourth embodiment has been described by way of an example where a wavelength band (a used wavelength band) for the WDM signal is a wide wavelength band of 12 nm or more. However, the present invention is not limited to the above example. Whatever the used wavelength band is, functions and effects similar to the above may be basically obtained so long as the compensation characteristic (transmission characteristic) of each of the loss difference compensating devices 5B through 5D is most suitably designed.

Each of the above embodiments has been described, taking the SMF 4, the DCF 42, the optical amplifier 43 (43', 46 or 47) as optical devices used in each of the WDM transmission systems 1A through 1D. However, the present invention is not limited to the above example, but loss difference compensation or classification in the menu similar to that in the above embodiments may be applied to other optical devices.

Still further, each of the above embodiments has been described byway of wavelength-dependent loss difference compensation by each of the loss difference compensating devices 5A through 5D. The loss difference compensation may be also done in the following manners.

(1) Manner Using Pre-emphasis

It is possible to compensate the above loss difference by adjusting, on the transmitting side (optical transmitting apparatus 2), a transmitting power of the WDM signal at each wavelength λi in advance (pre-emphasis) such that the transmitting power of the WDM signal has a characteristic reverse to the characteristic (tilt) of the loss difference generated in the WDM signal due to the wavelength-dependent loss characteristic of the SMF, the DCF or the optical amplifiers. This manner (pre-emphasis) is often used when a gain tilt in an optical amplifier cannot be sufficiently compensated, in general. However, there has not been a case where this manner is applied to compensate a wavelength-dependent loss difference generated by a combination of the SMF and the DCF, a combination of the SMF and the optical amplifiers, or a combination of the SMF, the DCF and the optical amplifiers.

In the case where a loss of the SMF and the DCF in a certain section is larger in a shorter wavelength than a longer wavelength (tilting upward to the right), the transmitting side transmits the WDM signal varying a transmitting power thereof at each wavelength in advance such that a transmitting power of a shorter wavelength is larger than a transmitting power of a longer wavelength. By adjusting the transmitting power at each wavelength λi such that an optical signal power at each wavelength λi is flat at a receiving end (optical receiving apparatus 3), it is possible to secure a uniform transmission characteristic without newly inserting a filter or without varying the amplification characteristic of the optical amplifier.

Control on the transmitting power on the transmitting side can be accomplished by adjusting a bias current value to be applied to the LD 21-i (refer to FIG. 1), or adjusting attenuation of an optical variable attenuator (ATT) prepared for each wavelength λi.

In conducting the pre-emphasis, it is necessary to beforehand grasp a characteristic of the transmission line. Namely, it is necessary to measure beforehand information about how much a transmitting power at a shorter wavelength is increased and how much a transmitting power at a longer wavelength is decreased, etc., and the transmitting power at each wavelength is set on the basis of results of the measurement.

Accordingly, an optical spectrum monitor is disposed in a repeat section or at a receiving end to monitor a state of a power of the WDM signal on the transmission line on request, and a result of the monitoring is fed back to an LD control circuit on the transmitting side or to a control circuit for the optical variable attenuator (ATT), whereby the transmitting power at each wavelength $\lambda i$ can be automatically controlled to an optimum power to compensate the above loss difference without measuring the characteristic of the transmission line in advance.

(2) Manner Using Again State of the Optical Amplifier

In an optical amplifier for WDM transmission such as EDFA or the like, when an excited light output power is varied, a gain characteristic thereof is changed. For example, when the excited light output power is increased, the gain characteristic of the optical amplifier is tilted upward to the right (a higher gain at a longer wavelength). Conversely, when the excited light power is decreased, the gain characteristic is tilted downward to the right (a higher gain at a shorter wavelength).

Using this phenomenon, the optical amplifier is beforehand made in an excited state where the optical amplifier has the gain characteristic reverse to the loss characteristic of the SMF or the loss characteristic that is an addition of the loss characteristics of the SMF and the DCF, or a loss characteristic that is an addition of loss characteristics of the SMF, the DCF and the optical amplifiers, whereby the wavelength-dependent loss difference generated by the SMF, or the SMF and the DCF, or the SMF, the DCF and the optical amplifiers can be actively compensated by the optical amplifier without the loss difference compensating devices 5A, 5B, . . . or 5D.

When the loss characteristic that is an addition of the loss characteristic of the SMF and the loss characteristic of the DCF is of a tilt characteristic upward to the right (a loss at a shorter wavelength>a loss at a longer wavelength), an excited light output power is adjusted such that the gain characteristic of the optical amplifiers is of a tilt characteristic downward to the right (a loss at a shorter wavelength<a loss at a longer wavelength) to control the gain state of the optical amplifier, for example.

At this time, a difference in tilt of the loss characteristic according to the used SMF and DCF and a gain state being able to compensate the tile are corresponded to each other and stored in a storage such as an EEPROM or the like in a control circuit of the optical amplifier, and the gain state stored in the storage is selected according to the used SMF and DCF to control the excited light output power such that the gain state of the optical amplifier becomes the selected gain state. Whereby, it is possible to comply with the loss characteristics of a plurality of tilts by one optical amplifier.

When a control on the gain state of the optical amplifier is used, it is unnecessary to newly insert an optical component such as the loss difference compensating device 5A, 5B . . . or 5D or the like. This manner is thus not only economical, but also effective to decrease a loss due to insertion of an optical component, and thus effective in the system designing.

Meanwhile, the gain state of the optical amplifier is changed by doping phosphorus (P) into an erbium doped fiber (EDF) (a gain at a shorter wavelength is increased, whereas a gain at a longer wavelength is decreased), as stated above. Using this property, the gain characteristic of the optical amplifier is in advance made reverse to a tilt of the loss characteristic of the SMF, or the SMF and the DCF, whereby a loss difference generated by the SMF, or the SMF and the DCF is cancelled by the optical amplifier. When a transmission distance of the WDM signal (a length of a repeat section, for example) is different from repeat section to repeat section, a quantity of doped phosphorus is adjusted and types of the optical amplifier is classified in a menu for each repeat section.

Note that the present invention is not limited to the above embodiments, but may be modified in various ways without departing from the scope of the present invention.

What is claimed is:

1. A wavelength-division multiplexing transmission system comprising:

an optical transmission line transmitting a wavelength-division-multiplexed optical signal having a wide wavelength band in which optical signals at a plurality of wavelengths are wavelength-division-multiplexed; and a loss difference compensator disposed in said optical transmission line to compensate a loss difference among the optical signals of the different wavelengths generated in said wavelength-division multiplexed optical signal due to a wavelength-dependent transmission loss characteristic peculiar to said optical transmission line.

2. The wavelength-division multiplexing transmission system according to claim 1, wherein said loss difference compensator is configured with an optical filter having a loss difference compensation characteristic according to a transmission distance of said wavelength-division-multiplexed optical signal in order to compensate said loss difference generated according to said transmission distance.

3. A wavelength-division multiplexing transmission system comprising:

an optical transmission line transmitting a wavelength-division-multiplexed optical signal having a wide wavelength band in which optical signals at a plurality of wavelengths are wavelength-division-multiplexed, said wavelength-division-multiplexed optical signal having a wavelength band not less than 12 nanometers centered at a 1.55 micrometer band as said wide wavelength band; and a loss difference compensator disposed in said optical transmission line to compensate a loss difference among the optical signals of the different wavelengths generated in said wavelength-division multiplexed optical signal due to a wavelength-dependent transmission loss characteristic peculiar to said optical transmission line.

4. The wavelength-division multiplexing transmission system according to claim 3, wherein said loss difference compensator is configured with an optical filter having a loss difference compensation characteristic according to a transmission distance of said wavelength-division multiplexed optical signal in order to compensate said loss difference generated according to said transmission distance.

5. A wavelength-division multiplexing transmission system comprising:

an optical transmission line transmitting a wavelength-division-multiplexed optical signal in which optical signals at a plurality of wavelengths are wavelength-division-multiplexed;

a dispersion compensator compensating dispersion generated in said wavelength-division-multiplexed optical signal due to a dispersion characteristic of said optical transmission line; and a loss difference compensator disposed in said optical transmission line to compensate a loss difference of an optical signal at each wavelength generated in said wavelength-division-multiplexed optical signal due to a wavelength-dependent transmission loss characteristic of said optical transmission line and a wavelength-dependent transmission loss characteristic of said dispersion compensator.

6. The wavelength-division multiplexing transmission system according to claim 5, wherein said wavelength-division multiplexed optical signal has a wide wavelength band wider than a predetermined wavelength band.

7. The wavelength-division multiplexing transmission system according to claim 6, wherein said wavelength-division-multiplexed optical signal has a wavelength band of not less than 12 nanometers centered at a 1.55 micrometer band as said wide wavelength band.

8. The wavelength-division multiplexing transmission system according to claim 7, wherein said loss difference compensator is disposed in the pre-stage of said dispersion compenstor.

9. The wavelength-division multiplexing transmission system according to claim 8, wherein said loss difference compensator is configured with an optical filter having a loss difference compensation characteristic according to a transmission distance of said wavelength-division multiplexed optical signal in order to compensate said loss difference generated according to said transmission distance.

10. The wavelength-division multiplexing transmission system according to claim 5, wherein said loss difference compensator is disposed in the pre-stage of said dispersion compensator.

11. The wavelength-division multiplexing transmission system according to claim 5, wherein said loss difference compensator is configured with an optical filter having a loss difference compensation characteristic according to a transmission distance of said wavelength-division multiplexed optical signal in order to compensate said loss difference generated according to said transmission distance.

12. The wavelength-division multiplexing transmission system according to claim 10, wherein said loss difference compensator is configured with an optical filter having a loss difference compensation characteristic according to a transmission distance of said wavelength-division multiplexed optical signal in order to compensate said loss difference generated according to said transmission distance.

13. The wavelength-division multiplexing transmission system according to claim 6, wherein said loss difference compensator is disposed in the pre-stage of said dispersion compensator.

14. The wavelength-division multiplexing transmission system according to claim 13, wherein said loss difference compensator is configured with an optical filter having a loss difference compensation characteristic according to a transmission distance of said wavelength-division multiplexed optical signal in order to compensate said loss difference generated according to said transmission distance.

15. The wavelength-division multiplexing transmission system according to claim 6, wherein said loss difference compensator is configured with an optical filter having a loss difference compensation characteristic according to a transmission distance of said wavelength-division multiplexed optical signal in order to compensate said loss difference generated according to said transmission distance.

16. The wavelength-division multiplexing transmission system according to claim 7, wherein said loss difference compensator is configured with an optical filter having a loss difference compensation characteristic according to a transmission distance of said wavelength-division multiplexed optical signal in order to compensate said loss difference generated according to said transmission distance.

17. A wavelength-division multiplexing transmission system comprising:
   an optical transmission line transmitting a wavelength-division-multiplexed optical signal in which optical signals at a plurality of wavelengths are wavelength-division-multiplexed;
   an optical amplifier amplifying said wavelength-division-multiplexed optical signal; and
   a loss difference compensator disposed in said optical transmission line to compensate a loss difference among the optical signals of the different wavelengths generated in said wavelength-division-multiplexed optical signal due to a wavelength-dependent transmission loss characteristic peculiar to said optical transmission line and a wavelength-dependent amplification loss characteristic peculiar to said optical amplifier.

18. The wavelength-division multiplexing transmission system according to claim 17, wherein said wavelength-division-multiplexed optical signal has a wide wavelength band wider than a predetermined wavelength band.

19. The wavelength-division multiplexing transmission system according to claim 18, wherein said loss difference compensator is configured with an optical filter having a loss difference compensation characteristic according to a transmission distance of said wavelength-division multiplexed optical signal in order to compensate said loss difference generated according to said transmission distance.

20. The wavelength-division multiplexing transmission system according to claim 17, wherein said loss difference compensator is configured with an optical filter having a loss difference compensation characteristic according to a transmission distance of said wavelength-division multiplexed optical signal in order to compensate said loss difference generated according to said transmission distance.

21. A wavelength-division multiplexing transmission system comprising:
   an optical transmission line transmitting a wavelength-division-multiplexed optical signal in which optical signals at a plurality of wavelengths are wavelength-division-multiplexed, wherein said wavelength-division multiplexed optical signal has a wavelength band wider than a predetermined wavelength band and not less than 12 nanometers centered at a 1.55 micrometer band as said wide wavelength band;
   an optical amplifier amplifying said wavelength-division-multiplexed optical signal; and
   a loss-difference compensator disposed in said optical transmission line to compensate a loss difference among the optical signals of the different wavelengths generated in said wavelength-division-multiplexed optical signal due to a wavelength-dependent transmission loss characteristic peculiar to said optical transmission line and a wavelength-dependent amplification loss characteristic peculiar to said optical amplifier.

22. The wavelength-division multiplexing transmission system according to claim 21, wherein said loss difference compensator is configured with an optical filter having a loss difference compensation characteristic according to a transmission distance of said wavelength-division multiplexed optical signal in order to compensate said loss difference generated according to said transmission distance.

23. A wavelength-division multiplexing transmission system comprising:
   an optical transmission line for transmitting a wavelength-division-multiplexed optical signal in which optical signals at a plurality of wavelengths are wavelength-division-multiplexed;

a dispersion compensator compensating dispersion generated in said wavelength-division-multiplexed optical signal due to a dispersion characteristic of said optical transmission line;

an optical amplifier amplifying said wavelength-division-multiplexed optical signal; and a loss difference compensator disposed in said optical transmission line to compensate a loss difference of an optical signal at each wavelength generated in said wavelength-division multiplexed optical signal due to a wavelength-dependent transmission loss characteristic of said optical transmission line, a wavelength-dependent transmission loss characteristic of said dispersion compensator and a wavelength-dependent amplification loss characteristic of said optical amplifier.

24. The wavelength-division multiplexing transmission system according to claim 23, wherein said wavelength-division-multiplexed optical signal has a wide wavelength band wider than a predetermined wavelength band.

25. The wavelength-division multiplexing transmission system according to claim 24, wherein said wavelength-division multiplexed optical signal has a wavelength band of not less than 12 nanometers centered at a 1.55 micrometer band as said wide wavelength band.

26. The wavelength-division multiplexing transmission system according to claim 25, wherein said loss difference compensator is disposed in the pre-stage of said dispersion compenstor.

27. The wavelength-division multiplexing transmission system according to claim 26, wherein said loss difference compensator is configured with an optical filter having a loss difference compensation characteristic according to a transmission distance of said wavelength-division multiplexed optical signal in order to compensate said loss difference generated according to said transmission distance.

28. The wavelength-division multiplexing transmission system according to claim 23, wherein said loss difference compensator is disposed in the pre-stage of said dispersion compensator.

29. The wavelength-division multiplexing transmission system according to claim 23, wherein said loss difference compensator is configured with an optical filter having a loss difference compensation characteristic according to a transmission distance of said wavelength-division multiplexed optical signal in order to compensate said loss difference generated according to said transmission distance.

30. The wavelength-division multiplexing transmission system according to claim 28, wherein said loss difference compensator is configured with an optical filter having a loss difference compensation characteristic according to a transmission distance of said wavelength-division multiplexed optical signal in order to compensate said loss difference generated according to said transmission distance.

31. The wavelength-division multiplexing transmission system according to claim 24, wherein said loss difference compensator is disposed in the pre-stage of said dispersion compensator.

32. The wavelength-division multiplexing transmission system according to claim 31, wherein said loss difference compensator is configured with an optical filter having a loss difference compensation characteristic according to a transmission distance of said wavelength-division multiplexed optical, signal in order to compensate said loss difference generated according to said transmission distance.

33. The wavelength-division multiplexing transmission system according to claim 25, wherein said loss difference compensator is configured with an optical filter having a loss difference compensation characteristic according to a transmission distance of said wavelength-division multiplexed optical signal in order to compensate said loss difference generated according to said transmission distance.

34. A method of designing a loss difference compensator used with an optical device used in a wavelength-division multiplexing (WDM) transmission system to transmit a wavelength-division-multiplexed optical signal, said method comprising making a menu table having a plurality of information sets, each of the sets including information on a transmission distance of the transmission section, and information on a loss difference compensation characteristic of a loss difference compensator to compensate a loss difference among the optical signals of the wavelengths generated in said wavelength-division-multiplexed optical signal in the transmission section according to its transmission distance due to a wavelength-dependent loss characteristic peculiar to said optical device;

selecting an optical device to be used in the corresponding transmission section and a loss difference compensation characteristic corresponding to said optical device in said menu table; and designing a loss difference compensator, which is to be provided at said corresponding transmission section, having the selected loss difference compensation characteristic compensating said loss difference generated in said transmission section.

35. The method of designing a loss difference compensator according to claim 34, wherein said optical device is an optical transmission line transmitting said wavelength-division-multiplexed optical signal; and a set of information on a length of the transmission line for the individual transmission sections, and information on a loss difference compensation characteristic compensating said loss difference generated due to a wavelength-dependent transmission loss characteristic peculiar to said optical transmission line according to its length is set into said menu table, as said individual information sets.

36. A method of designing a loss difference compensator used with a plurality of optical devices including an optical transmission line transmitting a wavelength-division-multiplexed optical signal and a dispersion compensator compensating dispersion generated in said wavelength-division-multiplexed optical signal due to a dispersion characteristic of said transmission line, which optical devices are used in wavelength-division multiplexing transmission (WDM) system comprising:

making a menu table having a plurality of information sets, each of the sets including information on a transmission distance of a transmission section of said WDM system, and information on a loss difference compensation characteristic of a loss difference compensator compensating a loss difference of a loss difference compensator compensating a loss difference among the optical signals of the wavelengths generated in said wavelength-division-multiplexed optical signal in the transmission section according to its transmission distance due to a wavelength-dependent loss characteristic peculiar to a combination of said optical transmission line and said dispersion compensator;

selecting a combination of an optical transmission line and a dispersion compensator to be used in the corresponding transmission section, and a loss difference compensation characteristic corresponding to the combination in said menu table; and designing a loss difference compensator, which is to be provided at the corresponding transmission section, having the selected loss difference compensation characteristic compensating said loss difference generated in said transmission section.

37. A method of designing a loss difference compensator used with a plurality of optical devices including an optical transmission line transmitting a wavelength-division-multiplexed optical signal and an optical amplifier amplifying said wavelength-division-multiplexed optical signal, which optical devices are used in a wavelength-division multiplexing transmission (WDM) system, comprising:

making a menu table having a plurality of information sets, each of the sets including information on a transmission distance of a transmission section of said WDM system, and information on a loss difference compensation characteristic of a loss difference compensator compensating a loss difference among the optical signals of the wavelengths generated in said wavelength-division-multiplexed optical signal in the transmission section according to its transmission distance due to a wavelength-dependent loss characteristic peculiar to a combination of said optical transmission line and said optical amplifier;

selecting a combination of an optical transmission line and an optical amplifier to be used in the corresponding transmission section, and a loss difference compensation characteristic corresponding to the combination in said menu table; and designing a loss difference compensator, which is to be provided at the corresponding transmission section, having the selected loss difference compensation characteristic compensating said loss difference generated in said transmission section.

38. A method of designing a loss difference compensator used with a plurality of optical devices including an optical transmission line transmitting a wavelength-division-multiplexed optical signal, a dispersion compensator compensating dispersion generated in said wavelength-division-multiplexed optical signal due to a dispersion characteristic of said transmission line, and an optical amplifier amplifying said wavelength-division-multiplexed optical signal, which optical devices are used in a wavelength-division multiplexing transmission (WDM) system, comprising:

making a menu table having a plurality of information sets, each of the sets including information on a transmission distance of a transmission section of said WDM system, and information on a loss difference compensation characteristic of a loss difference compensator compensating a loss difference among the optical signals of the wavelengths generated in said wavelength-division-multiplexed optical signal in the transmission section according to its transmission distance due to a wavelength-dependent loss characteristic peculiar to a combination of said optical transmission line, said dispersion compensator and said optical amplifier;

selecting a combination of an optical transmission line, a dispersion compensator and an optical amplifier to be used in the corresponding transmission section, and a loss difference compensation characteristic corresponding to said combination in said menu table; and designing a loss difference compensator, which is to be provided at the corresponding transmission section, having the selected loss difference compensation characteristic compensating said loss difference generated in said transmission, section.

39. The method of designing a loss difference compensator according to any one of claims 34, 36, 37 and 38, wherein said wavelength-division-multiplexed optical signal has a wide wavelength band wider than a predetermined wavelength band.

40. The method for designing a loss difference compensator for an optical device used in a wavelength-division multiplexing transmission system according to claim 39, wherein said wavelength-division-multiplexed optical signal has a wavelength band of not less than 12 nanometer centered at a 1.55 micrometer band as said wide wavelength band.

41. A method of configuring a wavelength-division multiplexing (WDM) transmission system transmitting a wavelength-division-multiplexed optical signal, composing:

making a menu table having a plurality of information sets, each of the sets including information on a transmission distance of the transmission section, and information on a loss difference compensation characteristic of a loss difference compensator compensating a loss difference among the optical signals of the wavelengths generated in said wavelength-division-multiplexed optical signal in the transmission section according to its transmission distance due to a wavelength-dependent loss characteristic peculiar to an optical device used in said transmission section of said WDM transmission system;

selecting an optical device to be used In the corresponding transmission section and a loss difference compensation characteristic corresponding to said optical device in said menu table;

designing a loss difference compensator, which is to be provided at said corresponding transmission section, having the selected loss difference compensation characteristic compensating said loss difference generated in said transmission section; and configuring said WDM transmission system using said selected optical device and said designed loss difference compensator.

42. The method of designing a loss difference compensator according to any one of claim 36, wherein said wavelength-division-multiplexed optical signal has a wide wavelength band wider than a predetermined wavelength band.

43. The method of designing a loss difference compensator according to any one of claim 37, wherein said wavelength-division-multiplexed optical signal has a wide wavelength band wider than a predetermined wavelength band.

44. The method of designing a loss difference compensator according to any one of claims 38, wherein said wavelength-division-multiplexed optical signal has a wide wavelength band wider than a predetermined wavelength band.

45. A wavelength-division multiplexing transmission system comprising:

an optical transmission line transmitting a wavelength-division-multiplexed optical signal having a wide wavelength band in which optical signals at a plurality of wavelengths are wavelength-division-multiplexed, said wavelength-division-multiplexed optical signal having a wavelength band not less than 12 nanometers centered at a 1.55 micrometer band as said wide wavelength band; and wavelength band; and a loss difference compensator disposed in said optical transmission line to compensate a loss difference of an optical signal at each wavelength generated in said wavelength-division multiplexed optical signal due to a wavelength-dependent transmission loss characteristic of said optical transmission line.

46. A wavelength-division multiplexing transmission system comprising:

an optical transmission line transmitting a wavelength-division-multiplexed optical signal in which optical signals at a plurality of wavelengths are wavelength-division-multiplexed, wherein said wavelength-division multiplexed optical signal has a wavelength band wider than a predetermined wavelength band and not less than 12 nanometers centered at a 1.55 micrometer band as said wide wavelength band;

an optical amplifier amplifying said wavelength-division-multiplexed optical signal; and a loss difference compensator disposed in said optical transmission line to compensate a loss difference of an optical signal at each wavelength generated in said wavelength-division-multiplexed optical signal due to a wavelength-dependent transmission loss characteristic of said optical transmission line and a wavelength-dependent amplification loss characteristic of said optical amplifier.

* * * * *